US007908020B2

(12) United States Patent
Pieronek

(10) Patent No.: US 7,908,020 B2
(45) Date of Patent: Mar. 15, 2011

(54) ARCHITECTURE FOR CONTROL SYSTEMS

(76) Inventor: Donald Pieronek, Brookfield, WI (US)

(*) Notice: Subject to any disclaimer, the term of this patent is extended or adjusted under 35 U.S.C. 154(b) by 870 days.

(21) Appl. No.: 11/317,318

(22) Filed: Dec. 23, 2005

(65) Prior Publication Data

US 2006/0155387 A1    Jul. 13, 2006

Related U.S. Application Data

(60) Provisional application No. 60/638,939, filed on Dec. 24, 2004, provisional application No. 60/638,690, filed on Dec. 24, 2004, provisional application No. 60/638,684, filed on Dec. 24, 2004.

(51) Int. Cl.
*G05B 19/18* (2006.01)
*G05B 11/01* (2006.01)
*G06F 15/00* (2006.01)
*G06F 9/44* (2006.01)
*G06F 3/00* (2006.01)
*G06F 11/00* (2006.01)
*G06F 5/00* (2006.01)
*G06F 13/00* (2006.01)
*G06F 13/36* (2006.01)

(52) U.S. Cl. .............. 700/19; 700/2; 710/61; 710/62; 710/104; 710/113; 712/14; 712/247; 717/104; 717/106; 717/108; 719/321; 726/22

(58) Field of Classification Search .......... 700/19, 700/2; 712/14, 247; 726/22; 717/106, 108, 717/104; 714/52; 710/61, 62, 104, 113; 719/321
See application file for complete search history.

(56) References Cited

U.S. PATENT DOCUMENTS

| | | | | |
|---|---|---|---|---|
| 4,212,078 A * | 7/1980 | Games et al. | .............. | 700/2 |
| 4,365,297 A * | 12/1982 | Grisham, Jr. | .............. | 710/8 |
| 4,949,299 A * | 8/1990 | Pickett | .............. | 710/105 |
| 5,452,201 A | 9/1995 | Pieronek et al. | | |
| 5,453,933 A * | 9/1995 | Wright et al. | .............. | 700/181 |
| 6,052,729 A | 4/2000 | Robinson | | |
| 6,195,591 B1 | 2/2001 | Nixon et al. | | |
| 6,424,872 B1 | 7/2002 | Glanzer et al. | | |
| 6,510,352 B1 | 1/2003 | Badavas et al. | | |
| 6,745,087 B2 | 6/2004 | Shah | | |
| 7,085,841 B2 | 8/2006 | Edwards et al. | | |
| 7,092,771 B2 | 8/2006 | Retlich et al. | | |

(Continued)

OTHER PUBLICATIONS

Pieronek-D., "Open Protocol or Open System Architecture" 1997, ISA Tech 97' Technology Update, vol. 1, Part 3. Newtork, Industrial Communications and Buses, p. 39-54.*

(Continued)

*Primary Examiner* — Ramesh B Patel
*Assistant Examiner* — Thomas Stevens
(74) *Attorney, Agent, or Firm* — Boyle Frederickson, S.C.

(57) ABSTRACT

An architecture for control systems including multiple control devices. The control devices include standardized software objects having functions, application programs for engaging these functions and thereby defining the operation of the control devices, and an engine for executing the application programs. The standardized software objects implement different types of internal functions for the control devices and feature reference numbering and function calls shared in common with the other software objects of the same type that may be on different control devices across said system. The software application programs include standardized instructions reflecting the reference numbering and function calls shared across the system by the said software objects whose functions are used in building the functionality of the control devices in the application programs.

20 Claims, 15 Drawing Sheets

U.S. PATENT DOCUMENTS

| | | | |
|---|---|---|---|
| 7,114,155 | B2 | 9/2006 | Stripf et al. |
| 7,117,049 | B2 | 10/2006 | Horn et al. |
| 7,130,704 | B2 | 10/2006 | McKelvey et al. |
| 7,523,237 | B2 * | 4/2009 | Gerig .......................... 710/105 |
| 2007/0179641 | A1 * | 8/2007 | Lucas et al. ..................... 700/83 |

OTHER PUBLICATIONS

Torsten Heverhagen, Robert Hirschfeld, Rudolf Tracht; "Function Blocks—Introduction"; www.functionblocks.org; Germany, p. 1-3.

David Kruglinski, George Shepherd, Scot Wingo; Programming Microsoft Visual C++, Fifth Edition; Microsoft Press, Redmond, WA, USA; 1998; pp. 569-583, (Chapter 24).

Bran Selic, Garth Gullekson, Paul Ward; "Real-Time Object-Oriented Modeling"; John Wiley & Sons; 1994; USA; pp. 46-86.

Heverhagen, T. et al., Function Blocks—Introduction, www.functionblocks.org., Germany, 3 pages.

Kruglinski, D. et al., Programming Microsoft Visual C++, 1998, Fifth Edition, pp. 569-611 (Chapter 24), Microsoft Press, Redmond, WA, USA.

Selic, B., et al., Real-Time Object-Oriented Modeling, 1994, pp. 46-86, John Wiley & Sons, Hoboken, NJ, USA.

Unified Modeling Language Superstructure, Aug. 2005, pp. 1-694, Version 2.0, OMG—Object Manager Group, Needham, MA, USA; www.omg.org.

Heverhagen, T., et al. A Profile for Integrating Function Blocks into the Unified Modeling Language, 2003, SVERTS Workshop, San Francisco, CA, www.functionblocks.org., Germany. 18 pages.

* cited by examiner

ARCHITECTURE FOR CONTROL SYSTEMS

This patent application claims the benefit of Provisional Patent Application Ser. No. 60/638,939 filed Dec. 24, 2004, Provisional Patent Application Ser. No. 60/638,690 filed Dec. 24, 2004 and Provisional Patent Application Ser. No. 60/638,684 filed Dec. 24, 2004 all filed with the United States Patent and Trademark Office.

TECHNICAL FIELD

The field of the present invention is control systems and more particularly architectures for control systems and especially control systems allowing for application programs to be used across different hardware platforms.

BACKGROUND OF THE INVENTION

Most control systems operate over a number of different control devices each of which represents a different type of hardware platform featuring its own unique hardware and software environment. Each control device requires custom programming to make the device function and operate as a component of the system. The functionality provided to the control system by the devices is limited by the software included with each control device where such product specific programming tools as may exist allow the limited configuration of the delivered device functionality. The proper operation and programming of such systems requires every operator and system programmer to be knowledgeable about the specifics of hardware and firmware associated with each device. The programs for the devices usually reflect different programming techniques; have large numbers of unique features that unique to the device. The programs across different types of devices generally share little in common except at the highest levels of functionality. Although some attempts have been to define user interface standards, they are limited to single types of devices (IEC 1131 programmable controller) and solely include instructions specific to those devices. Although a step in the right direction, the programs can not be transferred and loaded into products from different vendors. Since many programs for control devices are custom developed from scratch, in practice it is a challenging, burdensome, and time consuming job to program these types of control systems and the programs produced often require substantial debugging with multiple, device specific tools. Maintenance and support are equally challenging since available tools are, again, limited and there are little or no reliable organizational principles governing the structures of control device software and firmware.

SUMMARY OF THE INVENTION

The present invention comprises a consistent System Architecture composed of an System Architecture, Control Apparatus Architecture, Tool Device Architecture and Information Interface Architecture that provide a common interface across different types of Control Devices and across different systems, networks and applications. The programming method for all Control Apparatus, whether communicating or not communicating, is independent of the specific hardware platforms they represent and the network used to interconnect and program these Control Apparatus. The architecture allows the creation of a Control Devices by utilizing sets of standardized software objects, where the product functionality is determined by engaging functions within these objects and interconnecting the internal objects in accordance with the instructions in application program(s) that are executed by a special application execution engine on each device. The software application objects, application program and application engine provide a virtual system for and by which Control Apparatus can be programmed using a common tool via a standard interface where common application programs can be generated which are portable and capable of running on different Control Apparatus. This invention also defines an Object, Control Apparatus, Tool Device and System architecture where schematic design tool paradigms may be used to view, program and interconnect control logic, wiring, and hardware within a Control Apparatus to define the Control Apparatus behavior and target application behavior, as well as interconnect objects between Control Apparatus to create system behavior.

The present invention provides an architecture for use in programming and implementing control systems and control devices and especially automation control systems and devices. Each Control Apparatus includes a select set of software objects implementing internal functions for said Control Apparatus in shared and standardized formats by interfacing with the native operational functionality in these Control Apparatus, a software Application Program including a series of standardized calls to said objects for engaging their internal functions in order to define the functionality of the Apparatus, an execution engine for running said Application Programs on said Control Apparatus, an object control bus including shared memory on said Control Apparatus for passing values between said objects, a set of software communications objects and a configuration bus for changing said application programs and implementing network communications, a validation system for changing said application programs and processing external network communications, and a configuration bus including shared memory on said device for passing configuration messages between Control Apparatus. The architecture also includes an application programming architecture for use in a Tool Device that can be used in developing the application programs according to the common paradigm and downloading them to the Control Apparatus and in monitoring and profiling control devices. This invention replicates a superset of the Control Apparatus architecture within the Tool Device architecture enabling creation of Control Apparatus and system support tools using a common architecture. Each Tool Device contains support for additional objects required to support the Control Apparatus, Tool Device or other general purpose computers where object information may be accessed via a common database independent interface containing additional information required to archive, simulate, emulate and maintain Control Apparatus, networks and systems. The Tool Device architecture contains the same configuration bus and control bus as Control Apparatus but also includes a Tool Bus supports a common interface used for extended object interactions within the Tool Device associated with Tool Device functions such as programming/editing and schematic display that do not occur within the Control Apparatus. The system architecture also includes a System Bus supporting a common interface for interactions between Tool Devices and other computers for the exchange of information useful on a system-wide basis not necessarily contained within the Tool Devices or Control Apparatus. The Tool Device utilizes the same architecture contained within Control Apparatus to manage hardware interfaces within the system and utilizes the same architecture to simulate, emulate and monitor the Control Devices, control hardware and controlled equipment. The System architecture, Tool Device architecture and Control Apparatus architecture provides a common network independent interface for application programs to send and receive messages across any supported network.

This invention comprises a "containment system architecture" where: a plant contains multiple systems, a system contains multiple devices, multiple devices are interconnected via networks, hard wiring, equipment, machines and processes, devices contain hardware and software/firmware (software) objects generally accessible via networks, objects contain related control functions (code) and properties (data) and always contain a standard Public Interface to Application Programs and Public Network Interface Dialogs. The standard Public Interface and Network Dialogs are based on using the same: Object Class Identifiers, Service Identifiers, Property Identifiers, Function Identifiers, Error Identifiers, "Error Response" Dialogs and Request Message "Error Checking" order.

It is an Object of this Invention this Invention to Feature and Provide:

a common software architecture having objects with standard functions, properties and identifiers utilized in all devices in the system and plant enabling the use of the same objects everywhere, standard rules and interfaces used to retrieve, modify and configure the objects within all the device, Public Application Program(s) that determine how a device operates internally and are "Portable" across ALL devices that support the required common object classes, object properties and object functions (i.e. "Portable Application Program(s)"), Public Portable Application Program(s) that include representations of physical devices externally connected to the device and the physical hardware within the device, Public Portable Application Program(s) may have device diagnostic capabilities added as needed using a Tool Device (diagnostics are not required to be contained within a device when built by the device manufacturer), Public Portable Application Program(s) that may be used to create network interface behaviors and network interface behaviors that may change dynamically based upon Application Program decisions, a Tool Device architecture, which utilizes an extension of the same software architecture used within the devices, Tool Device that may download "Profiling Application Programs" to devices that alter the state of Hardware Profile Output(s) (digital on/off outputs) which may be used to determine execution time of each object function within a device by transitioning objects through their desired states and state transitions to produce "Device Performance Profiles" that can be stored in System Libraries for later use by Tool Devices, A Tool Device that may download equipment monitoring Portable Application Programs to devices in a system, which can then capture the actual timing and magnitude information from the equipment being controlled and can collect the resulting "Equipment Operational Profile" information that can be stored in System Libraries for later use by Tool Devices, Captured Equipment Operational Profile information is stored in a System Library, Tool Device that can select a Portable Application Program from the System Library, select a Device Performance Profile from the System Library and optionally select a Equipment Operational Profile from the System Library and can then execute the Portable Application Program within the Tool Device, associating the Device Performance Profile execution times with the execution of the selected device, stimulating changes within the selected device(s) using the Captured Equipment Profile and determine if the combination of the selected Portable information can meet the equipment performance requirements.

DETAILED DESCRIPTION

Definition of Terms

Figure 1:
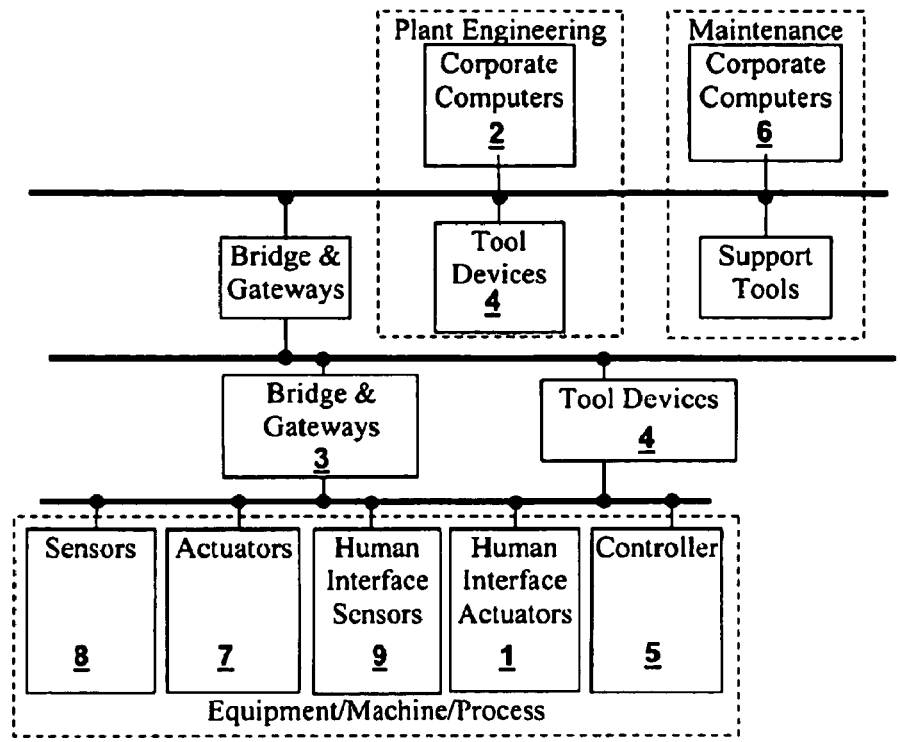
FIG. 1 is a control system overview including representative devices connected to networks in accordance with the present invention.

The following terms are defined for the convenience of reader in understanding the invention and are not intended to be scientifically commercially or legally exact or specifically limit the scope of the invention or the scope of similar terms that may be used in the claims.

Inputs: Information coming into Control Apparatus and passing into a software object. With reference to the physical world, where voltages, currents, light, pressure, bit streams from networks and so forth are referred to as inputs when received as variables or turned into variables then used by the Application Program. The word input is not to infer any specific implementation or interface and includes all sensors, human inputs, network interfaces and so forth.

Outputs: Information sent out of Control Apparatus and passing out of software objects. Outputs are converted to some form of energy, usually electrical energy by the hardware and exit the device via wiring terminals, light, sound, electromagnetic energy, all forms of networks and so forth. The word output is not to infer any specific implementation or interface and includes all actuators, human outputs and so forth.

Control Apparatus: A device, composed of hardware and software (including firmware), which monitors available inputs within a system and uses an Application Program to determine a new state for available outputs based upon the state of these inputs and the current state of the equipment being controlled, and which may contain a network interface.

Tool Device: A device, containing software and network interfaces, that reads the capabilities of the Control Apparatus within the system, the Application Programs contained within the Control Apparatus and allows the end user to view the Application Programs, usually as schematics, relating to the Control Apparatus, program, monitor and or modify the Application Programs within the Control Apparatus in order to change the operation of the Control Apparatus or the equipment being controlled.

Application Program: A list of standardized instructions embodying the internal operation of the Control Device and the application of the Control Device that are performed by an Execution Engine and that employs the current state of the available inputs and the current state of the equipment being controlled to determine a new state for the available outputs. Application Programs reside within Control Apparatus and are modified by Tool Devices. The Application Program interface format may also be used to provide system information that is not executed.

Application Program Components: A list of instructions that are used to perform a limited function which is a part of the total functionality required within a Control Apparatus and that can be utilized to provide the same function within Application Programs on other Control Apparatus.

Object: A collection of related software functions and data that are adapted for providing given type of generic functionality. The data within an object, called properties, that can only be modified by the object's functions within the object. This is contrary to historical software techniques that allow any function to modify any data within a control device.

Control Bus: Memory reserved for and used for passing values between objects and between hardware drivers and objects at the direction of Application Programs. This shared memory view is utilized to enforce a common interface between all application object software functions.

Property: A variable or collection of variables owned by an object, where the variables have values, and where the value of some variables has specific meaning to the object. An object defines its properties where the properties of an object are not accessed by other objects unless specifically allowed.

Function: The actual executable code that performs operations within an object and can operate on and change the properties of the object, often referred to as a method. The common software reference of method is not generally used in this patent since it could be confused with more common meanings of the term.

Configuration Message: A software interface protocol where the meaning of the remainder of a request message is dependent upon the prior values in the request message. The request message is sent by a requester and interpreted by responder. In general the responder performs the requested actions and returns an appropriate response message to the requestor.

Control Message: A software interface protocol is determined by the execution of functions within the Application Program that set the data at an offset within a message.

Profile: A collection of information that describes capabilities or provides metrics on the capabilities of an object, an Application Program, a Control Apparatus, a System or any component within a system.

Emulation: The process of executing an application program on actual device hardware where the hardware may not be installed, or is partially installed on equipment and where portions of the hardware or hardware interfaces are stimulated by software within the target device versus the actual equipment being controlled.

Simulation: The process of executing an application program on hardware other then the actual target device hardware, like a personal computer, where the application software is stimulated by other software to approximate the operation of the actual equipment being controlled.

Hardware Device Driver: The software (or firmware) running on hardware platforms that allows Application Programs to make use of hardware relays, timers, inputs, outputs, serial ports and so forth that are part of the platform.

Firmware: Generally, Software that remains permanently installed on hardware devices and is infrequently reloaded. In this patent the terms software and firmware are often used interchangeably.

Network: An interface governed by communication protocols used to transport messages between two or more devices. The method of transport may be serial or parallel and may take any energy form, such as electrical, optical or RF signals.

GENERAL DESCRIPTION AND EXAMPLES

This invention defines the internal Control Apparatus architecture and network interface architecture within a Control Apparatus required to achieve a common control, information and network architecture from a simple Control Apparatus without a network interface up through a highly functional and complex fully programmable Control Apparatus that supports multiple networks and contains numerous forms of inputs and outputs and includes interfaces to enterprise level information management systems.

This invention defines a Tool Device architecture that contains all the functionality of the Control Apparatus architecture and extends the core functionality to support Software Tool Device applications and extends the Control Apparatus and Tool Device external interface dialogs to include a common external interface to the enterprise level system information management systems. This invention defines a System Architecture, where the Tool Device Architecture and Control Apparatus architecture are a subset of the System Architecture and thus contain consistent interfaces and behaviors with the System Architecture.

An automation system is composed of control devices that are usually connected to networks and that ordinarily containing specialized software developed to provide the functionality of the target device and fulfill the application requirements. Currently systems share data, and the most advanced systems share some common network interface message definitions and optionally define a common set of protocols used to modify the value of select data variables within the internal memory of devices. The devices utilizing the current paradigm convey a subset of data to represent their internal state of a device based upon the "value" of a limited amount of "data" made accessible at the device interfaces by the device vendor. Knowledge of what is inside a device and may modify the data and the relationship of one internal variable to another variable within a device is not available at the network interface. However, information about the internal operational behavior within devices and the processes being controlled are often needed by various disciplines at some point or another. Unfortunately, common access, conveyance and storage technologies of existing information within control devices is inaccessible and/or product specific which makes it very difficult to not only access this data, but difficult to design, integrate and maintain the dissimilar interfaces across dissimilar devices connected to dissimilar networks. The key to achieving "plug and play" as well as facilitating continuous process improvement methodologies is to utilize a common and extensible object based architecture across all Control Apparatus and networks. Implementing a common and extensible public object based architecture across all Control Apparatus and networks is the primary focus of this invention.

System Architecture Overview

Referring now to FIG. 1, the control system includes Tool Devices (4) and all forms of Control Apparatus, bridges and gateways (3), controllers (5), sensors (8), actuators (7), human sensors (9), human actuators (1) and interfaces within general purpose computers (6) connected and networked together as part of a control system. Although a manufacturing operation is illustrated, this control architecture may be applied to vehicles, commercial buildings, home automation systems or any other application domain requiring a flexible, scalable and extensible control system architecture. Any combination of Control Apparatus, networks and Application Program partitioning is possible utilizing this invention.

All internal operations, interactions with input and output hardware interfaces and network interactions within a specific Control Apparatus are contained within portable and visible Application Programs. Within FIG. 1 all forms of monitoring devices (inputs) are included in the "Sensors" (8) device category, including "Human Interface Sensors" (9). Within FIG. 1 all forms of control devices (outputs) are included in the "Actuators" (7) device category, including "Human Interface Actuators" (1). "Human Interface Sensors" (9) are traditionally separated from other forms of equipment, machine and process sensors since their inputs are not monitoring physical equipment and their programming paradigm varied from other control devices. This invention defines Human Interface Sensors (9) as being the same as any other Control Apparatus and includes interfaces to humans like pushbuttons, keypads, a computer mouse, a touch screen, a voice recognition interface and so forth. Human Interface Actuators (1) are also traditionally separated from the general category of Actuators (7). This invention defines Human Interface Actuators (1) as Control Apparatus and includes interfaces to humans like displays, lights, audible information, and physical displacement components. Output information from Human Interface Actuators (1) must be recognized by human operators who may or may not take a control action in a deterministic manner via Human Interface Sensors (9). Traditional equipment does not transparently integrate most Human Interface Control Apparatus within the control loop, and as such, has traditionally provided different operational paradigms, different programming tools, different programming languages and so forth that make various forms of system diagnostics and the system integration difficult. Traditional human interface devices primarily monitor the value of data variables or set the configured data value via a product specific programming interface or modify data via device specific network interface. This invention utilizes the same object based architecture within Human Interface Sensor Control Apparatus (9) and Human Interface Actuator Control Apparatus (1) and provides the necessary objects to support these interfaces in a manner consistent with all other Control Apparatus. Unlike traditional Tool Devices (4) that contain product specific programming software, the Tool Devices (4) in FIG. 1 for this invention are implemented utilizing a superset of the same internal object based architecture implemented within the Control Apparatus to facilitate integration, configuration, diagnostics and the like of all Control Apparatus in a single tool architecture.

For example, utilizing existing technologies, relative to a Sensor (8) on the machine in FIG. 1 a maintenance computer (6) may currently have knowledge of the Sensor's (8) part number, its spare parts location and so forth. Due to the specialized nature of the "configuration data" for a traditional configurable sensor device, this device is generally configured on the manufacturing floor, within a vehicle or within a building with specialized tool devices having knowledge of unique device specific interfaces and often utilizing a point to point interface to the device. The closest traditional devices come to providing a common configuration interface is to provide a common file transfer protocol for a specific network, where the specific content of the files being transferred to traditional devices is largely unknown and incompatible with other devices. In effect traditional file downloads are a long string of bytes, whose interpretation is known only to the end device and a product specific programming tool. In traditional systems, the association of the Sensors and Actuators (transducers), relative to the physical connections to the controlled equipment is often called wiring diagrams, at best, are contained in documentation files maintained by special tool devices and manipulated by special software and whose file contents contain additional system information like the wire numbers, screw terminal designations and so forth not contained within the control device or directly associated with a specific control device. This traditional information "may" be accessible on the plant floor via connected networks, but is stored in different file formats based upon the specific Computer Aided Design (CAD) software used to support the drawings and is not compatible with the device specific programming tools. Knowledge of the "actuation profile" (amplitude versus time) or the rate of Sensor (8) stimulation by the controlled equipment and a sensor's stimulation intensity is not known to CAD software and generally not known to anything other then the Sensor device and not accessible to the user. If a highly functional traditional device is utilized, this real time process information could possibly be monitored by another associated device over an available network assuming the device vendor provided the necessary monitoring functionality within the sensor. However, if acquired at all real time process information would be stored in a format, and using a storage and retrieval interface that is not compatible with other tool device software. If available, this application domain information would be useful for multiple purposes, like predictive diagnostics, for assisting purchasing when selecting replacement devices, and would ideally be captured in real time and used to "stimulate alternate Control Apparatus and their associated application program configurations" to improve control accuracy, performance or fault tolerance of the controlled equipment.

This Control Apparatus architecture invention provides the ability to temporarily, or permanently add this physical actuation monitoring functionality to the respective. Control Apparatus utilizing portable Application Program Components downloaded to the Application Program property of the Engine Object within the Control Apparatus utilizing a common interface used to configure all Control Apparatus as well as a common interface used to store and maintain the acquired information for use by any other Tool Devices (4) which support this common interface.

Control Apparatus Architecture Model Overview

Figure 2:
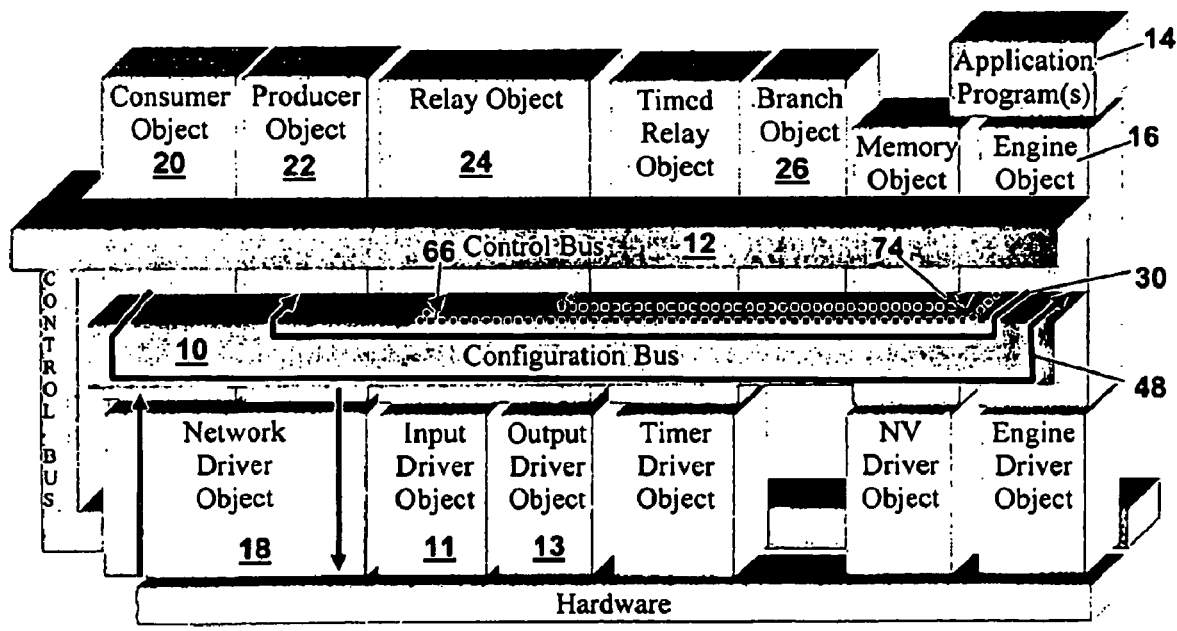
FIG. 2 is a software object architecture model of a device in accordance with the present invention.

Referring now to FIG. 2, the core object model of a Control Apparatus including software objects such as consumer object (20), producer object (22), relay object (24), branch object (26) and engine object (16) as shown where objects within a Control Apparatus interact with an external configuration network via the Configuration Bus (10) and interact internally among themselves using the Control Bus (12). Within this Control Apparatus architecture invention, interactions with objects only occur at the bus interfaces.

Figure 3:
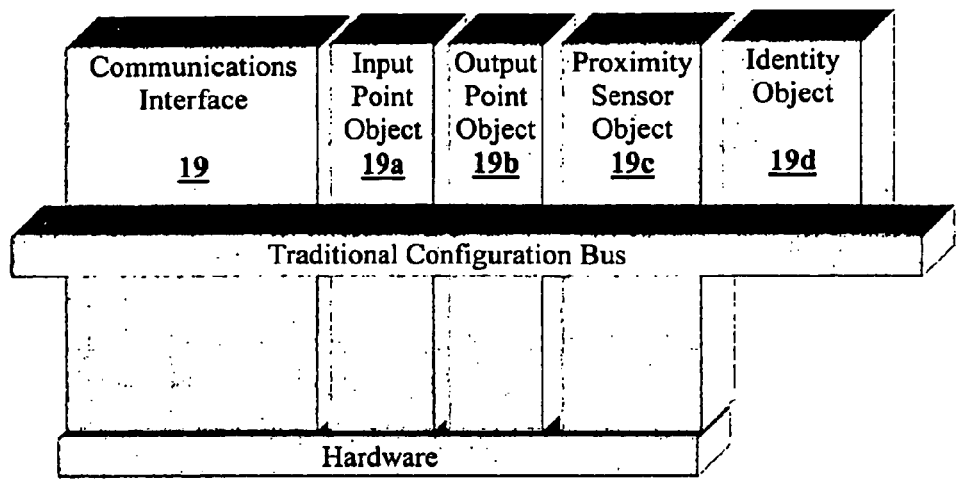
FIG. 3 is a software object architecture model of a prior art control device.

This is unlike traditional object architecture models similar to the model in FIG. 3 that may define control device functionality utilizing an object paradigm including objects like the Input Point Object (19a) the Output Point Object (19b), and the Identity Object (19d) and may define Configuration Bus dialogs with object properties via a common external Connection Object (19), but then do not provide an interface to the internal operation of a control device to the network and therefore the internal operation of a device is not visible or editable by the user.

This architecture invention rigidly enforces the referenced model in FIG. 2 where the architecture model is an accurate representation of the implementation details inside a Control Apparatus. Per FIG. 2 this architecture invention performs the internal and external interactions with the Control Apparatus hardware utilizing common functions within the Application Program (14) property of the Engine Object (16). Each instance of the Engine Object (16) may contain an Application Program (14) property, and multiple instances of the Engine Object (16) may reside within a Control Apparatus. When multiple instances of the Application Program (14) reside within a Control Apparatus, the first instance executed is called the Primary Application Program. The content of the Application Program (14) property not only contains the control programs for a specific application of a Control Apparatus utilizing functionality similar programmable devices today, but Application Programs are additionally utilized to determine the internal operation of the Control Apparatus itself. If the content of the Primary Application Program (14) is cleared, in the preferred implementation the Control Apparatus would no longer perform useful control functions of any kind and would only be capable of receiving configuration commands over the Configuration Bus.

For example, a Control Apparatus contains a diagnostic LED, in traditional control device whose architecture is shown in FIG. 3 the LED is controlled by inaccessible product firmware and illuminates the LED based upon the device vendor's desires, where the interpretation of the LED behavior is documented in a product manual of some type. When the present architecture invention is used in its preferred implementation the LED would not illuminate unless an Application Program (14) instructs it to do so. In FIG. 2 the Output Driver Object (13) that toggles the hardware to illuminate the LED runs when the appropriate function is contained within an Application Program (14). If the Control Apparatus contains pushbuttons, they would not be monitored unless an Input Driver Object (11) function is contained within an Application Program (14) and action would not be taken based on their status without provision by an Application Program (14) detecting their depression and taking the desired actions. In the preferred implementation, without an Application Program the Control Apparatus would be useless.

The reason for placing core Control Apparatus functionality within the Application Program is one core invention, as it makes the internal operation of a Control Apparatus accessible, and therefore visible and thus enables accurately diagnosing Control Apparatus faults and behaviors, as well as enables altering the Control Apparatus operation based upon the needs of the target application. This architecture invention separates the hardware capabilities of a Control Apparatus from its intended usage by allowing the internal operation of the Control Apparatus to be totally contained within Application Program(s). An example of a common diagnostic scenario follows.

Figure 4:
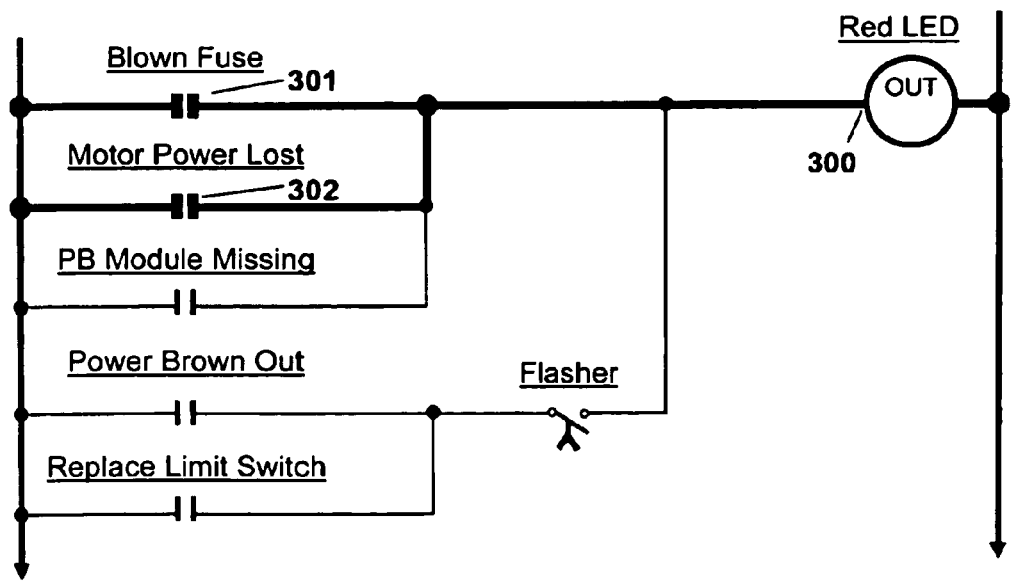
FIG. 4 is a graphical representation of a portion of an internal application program monitoring internal faults within a device in accordance with the present invention.

For example, a user may naturally desire to know why a red diagnostic LED is currently turned on and is not flashing, what causes the LED to behave in this manner in this product? Rather then referring to a product manual, a Tool Device (4) could retrieve the Application Program (14) over the network and display the logic for the application and show the various conditions which activate the Red LED as well as display which of these condition(s) are currently true, thus accurately identifying the specific cause of the fault. As shown in the control schematic of FIG. 4 the "Red LED" (300) is on steady because the "Motor Power Lost" (302) and the "Blown Fuse" (301) contacts are closed, providing power to the Red LED. A user's manual is not required nor any special diagnostic software was required to accurately and rapidly diagnose the faults. All that was required was the core Tool Device (4) Application Program (14) viewing software used for displaying and monitoring Application Programs in all Control Apparatus. A well designed traditional control device would generally implement a fault code value for each fault condition which is retrieved over the network which is then decoded by another device, where the meaning of each error code is contained in a product manual and custom software is written to enunciate the error within a human interface device or a custom programming tool.

Traditional Object Based Architectures

Traditional control devices, even if based upon an object paradigm do not allow viewing these Control Apparatus specific behaviors nor do they provide the ability to modify these behaviors. They solely allow modification of some properties of some of the existing objects within the control device. As shown in FIG. 3 these architectures classify a device for a specific range of uses, where one network standard utilizes a "device type" within an Identity Object (19c) which determines a limited set of configurable object interfaces and behaviors fixed in firmware within the product. When utilizing the device type approach, if the desired functionality is not present within an object standard, the desired functionality can only be added in a "proprietary vendor specific range" where the custom configuration dialogs must be programmed into another device, generally a proprietary tool, to access and enunciate the vendor specific functionality.

The present invention utilizes the interconnection of common instructions within an Application Program (14), utilizes a common interface for reading and or modifying these instructions, provides a common method of enunciating these instructions on a common Tool Device (4) as a means of providing nearly any desired functionality. These common instructions, that utilize common properties, are grouped into objects, where these instructions become functions of the respective objects. These object functions manage the value of these common properties utilizing an interface bus shared by all objects within the Control Apparatus.

In the traditional object architectures, if a specific "device type" is required to control a specific piece of equipment, and when the desired device type is not currently defined in the object and device type standard, a proprietary device interface is the only solution available. When the proprietary device interface is used, system integration and support suffers. Although a significant improvement over totally vendor specific interfaces and networks, exiting object based standards are difficult to integrate, diagnose or maintain for any system requiring anything beyond the basic object behaviors.

Application Programs for Core Behavior

In the preferred implementation this invention makes no restrictions on object access, object interfaces or interconnection of internal object interfaces and only limits the functionality of a Control Apparatus based upon the type of inputs and outputs supported by the Control Apparatus hardware as well as the objects contained within the Control Apparatus. In this invention the equivalent of the traditional device type paradigm does not exist since a devices behavior is determined by the current contents of the Application Programs (14) and thus a single Control Apparatus could have its Application Programs (14) changed to replace multiple traditional fixed function products of different device types. Although discussed later in this invention, to create the desired traditional device type within a Control Apparatus supporting this architecture an Application Program Component from the Application Program Component Library would be downloaded to a Control Apparatus, where the Control Apparatus must minimally contain the inputs and outputs necessary to achieve the desired "device type" functionality. In effect, this invention provides clearly defined "software integrated circuits" (objects with interface rules) that may then be interconnected utilizing a hardware schematic paradigm, where the combination of the objects available and their interconnections determine the functionality of the Control Apparatus, where the object and schematic view include not only the schematic for the target equipment application (Application Program) but also the schematic (Application Program) for the internal operation of the Control Apparatus as well as the hardware interfaces to the external world, and optionally the interconnects between devices external to the Control Apparatus where a subset of a single System architecture is implemented within the Control Apparatus architecture maintained by a single software Tool Device (4) architecture, which is also a subset of the common System Architecture. Due to the ability to read, view and alter the internal operation of a Control Apparatus this invention utilizes the Application Program (14) to separate the capabilities of the Control Apparatus hardware from its end use, where the same hardware can have multiple usages by merely modifying the Application Programs (14).

Referring now again to FIG. 2 this invention defines a real time object based Control Apparatus architecture composed of an internal Control Bus (12), an internal Configuration Bus (10), and a set of objects (20, 22, 24, 26, and 28) that determine the operation of the Control Apparatus which may be accessed via any supported network. The Configuration Bus (10) manages the interpreted configuration and monitoring messages from any external network to and from the internal objects. The internal Application Programs (14) that define the operation of the Control Apparatus are optionally accessed via a Configuration Bus (10). The internal Application Programs (14) trigger the interaction of internal objects over the Control Bus (12) and thus determines the behavior of the Control Apparatus.

The Application Program (14) sets the default (as shipped) behavior of a Control Apparatus which may be optionally altered to modify the Application Program (14) behaviors within a Control Apparatus utilizing a common set of external interfaces. The object architecture defines methods to translate a common external Application Program (14) format into an internal Application Program (14) format making it executable within any Control Apparatus, optionally containing different microprocessors and developed using different programming languages.

The internal object interaction within a Control Apparatus is contained within Application Programs (14) which may be externally accessible via the Configuration Bus (10). In traditional software, code within one function (method) of one object class can call functions (methods) within other object classes and any function of any object class can directly call any other object functions without restriction. Although the traditional software approaches are extremely flexible for developing products this continuous daisy chain approach spreads the operation of the software throughout the software objects within the Control Apparatus. This makes it extremely difficult to extract, view, debug programs and makes in nearly impossible to make the application programs portable across Control Apparatus. Additionally traditional software programming approaches pass variables or pointers between objects, where the values passed between the various functions are dependent upon the function being called. Although extremely flexible this freedom of function interface variations requires the calling functions to be aware of the called functions interface. Some specialized Control Apparatus, called programmable controllers, provide one externally accessible application program but do not allow viewing and/or modification of any of the internal operations of the programmable controller. Further they do not define a common application program interface across all types of Control Apparatus that are not a specific type of programmable controller, nor do they support an extensible set of objects. Programmable controller operations is determined by its "device type" which happens to be a particular programmable controller that performs certain types of functions but only as determined by the manufacturer. Some portable programming textual languages, such a Java, allow a limited level of portability but they enable any object to call any other object, without restriction, thus providing only portability of collections of functionality in contiguous memory (code) across other devices also written in Java, without the ability to view and easily alter the interaction of objects within a device. Additionally the individual writing each function is allowed to define any desired interface for the variables passed into and returned from the function, or simply stated, utilization of a common language does not define an architecture.

The present inventions Control Apparatus architecture centralizes object interactions within one or more Application Programs (14) which are portable across any type of Control Apparatus, whose object firmware may be written in any programming language, and allows the internal operation of the Control Apparatus to viewed and/or modified by the user through the Application Program over the Configuration Bus (10) using a common external interface protocol where the implementation of the objects within the Control Apparatus follow the System architecture interface rules to both the Control Bus (12) and Configuration Bus (12) thus providing portability of Application Programs (14). System interface rules are provided which allow the creation of compliant objects utilizing any programming language, and allow the implementation of any object class on any hardware platform.

In the preferred implementation the Application Programs (14) are a property of a special subclass of the Engine Object (16) class. Placement of the Application Program (14) "call lists" in one property of one object class facilitates extraction, as well as viewing and alteration of interconnects between objects during configuration and during execution of the Application Programs (14). It should be noted that locating Application Programs (14) in a single object class is not a rigid requirement, but this architecture rule may not be violated unless sufficient reasons exist to do so, and then the alternate object class must be clearly defined for purposes of Application Program (14) portability. This architecture allows the conversion of the Control Apparatus specific internal Application Program (14) format to a common Control Apparatus independent external format for object dialogs occurring over the Configuration Bus (10). When this feature is combined with a graphical editing tool that supports the architecture paradigm, Application Programs (14) may be easily maintained and shared across any type of Control Apparatus. This invention also supports non graphical programming paradigms commonly referred to as instruction lists, eliminating the more difficult task within a Tool Device to translate instructions into the appropriate icons and graphically organize and draw these interconnected objects in a human readable format. This invention defines instruction lists as a set of Application Program (14) instructions that are viewed and edited textually versus graphically. Although these instruction lists may be inherently more flexible then the graphical ladder logic paradigm since execution order can more easily be manipulated, this graphical interface invention allows the conversion between the two paradigms with equivalent flexibility.

To implement this functionality, the present invention defines standardized external Function Identifiers for the internal real time functions of each object class. The assigned external Function Identifiers for the respective object classes are then common across all Control Apparatus, independent of the hardware (microprocessor) or network used. A Tool Device (4) may determine Function Identifiers supported by each object class from the Control Apparatus itself and uses this information to display and optionally monitor and alter the operation of the Control Apparatus, when the Control Apparatus allows modification of its Application Programs (14). This invention allows any combination of usages of the architecture features, like inhibiting access to the Application Programs (14), solely supporting the ability to read the Application Program (14), only allowing reading and monitoring the state of the Application Program (14), allowing editing of the Application Program (14) and so forth. Obviously inhibiting the access to Application Programs (14) would not provide all the benefits of the architecture.

Configuration Bus

Figure 5:
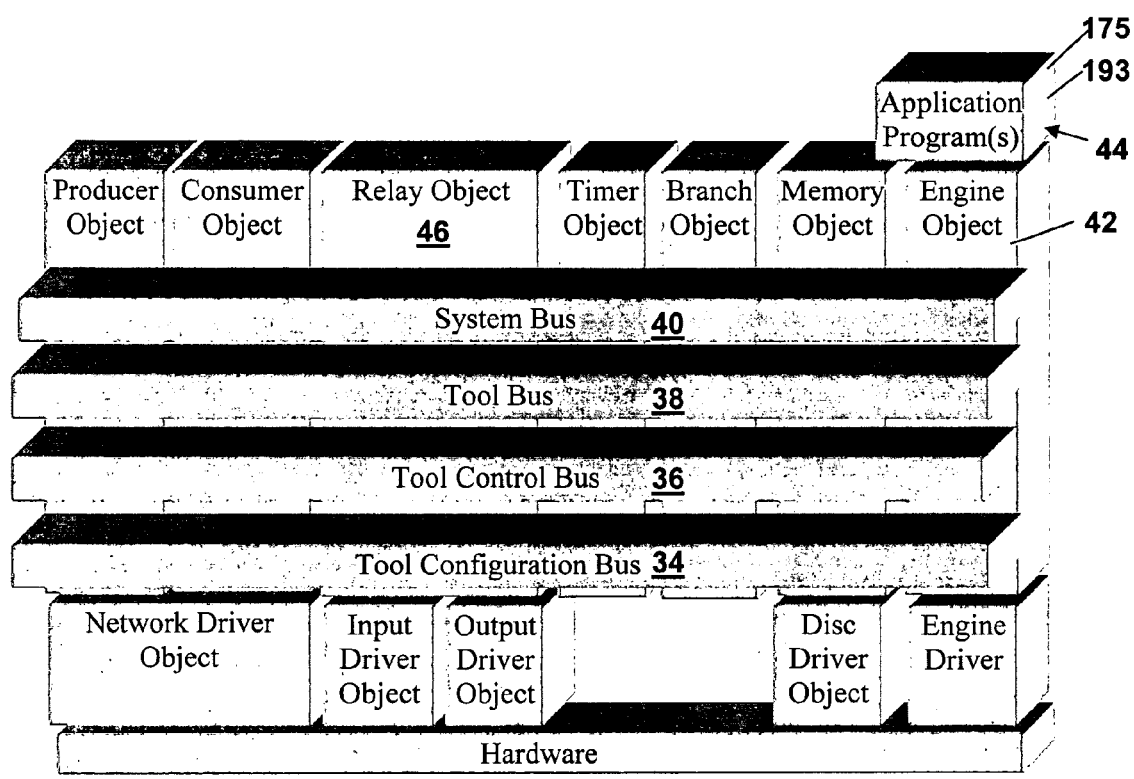
FIG. 5 is a software object architecture model of a tool device in accordance with the present invention

As indicated in FIG. 2 two interface buses reside within a typical Control Apparatus for passing values and messages and four busses may reside within a Tool Device (4) discussed later and as shown in FIG. 5. The Configuration Bus (10) provides the external configuration interface for objects within the Control Apparatus utilizing an interpreted message protocol. An interpreted protocol is common in the art and as shown in FIG. 2, interpreted configuration and diagnostic messages are received from the network hardware by a Network Driver Object (18), and delivered to an internal Consumer Object (20), which then delivers the Request Message (48) to the Engine Object (16). The Engine Object (16) contains knowledge of the Configuration Bus (10) interface functions and all the Control Bus (12) interface functions of externally accessible objects within the Control Apparatus. The Engine Object (16) interprets the Request Message (48) and passes the message to the appropriate object class within the Control Apparatus. As shown by example in FIG. 2, the Engine Object (16) determined that a message received is destined for the Relay Object (24), and informs (66) the Relay Object, which then reads the Request Message (48) and writes the appropriate Response Message. The Relay Object (24) then indicates (74) to the Engine Object (16) that a message is ready which then in turn indicates (30) to the Producer Object (22) that a response is ready to send. The Producer Object (22) then initiates its transmission on the external network using the Network Driver Object (18).

All objects within this invention utilize common external interpreted configuration dialogs that occur over the Configuration Bus (10). The interfaces to the Configuration Bus (10) and the dialogs between the Configuration Bus (10) and the Network Driver Object (18) are generally contained in firmware, and are not normally affected by the state or content of the Application Programs (14). Although these configuration interfaces could be managed by an Application Program (14) created for this purpose, in the preferred implementation this interface and behavior is not directly editable by a Tool Device (4) since errors in this specific Application Program (14) could leave the Control Apparatus inoperable.

As is shown in FIG. 2, the Engine Object (16) provides the coupling between the Tool Device (4), usually external to the Control Apparatus, and the Application Program (14) which determines the internal operation of the Control Apparatus. When the Network driver Object (18) received the Request Message (48) it delivered this message to the Consumer Object (20). As further detailed in the partial data flow diagram in FIG. 6 that in the preferred implementation, upon receipt of a Request Message (48) the Enable (53) function of the Consumer Object (20) indicates (52) to the Interpreted Execute (50) the receipt of an interpreted Request Message which results in the execution of the Interpreted Execute function within the Engine Object (16). The Interpreted Execute (50) function reads the Request Message (48) and determines which object class within the Control Apparatus should service the Request Message, or services it itself if the request is destined for the Engine Object (16). Assuming the Interpreted Execute (50) function determines the Request Message (48) was destined for the Relay Object (24) class, it would call (51) the Relay Object's Parser (64) function. Further details on the servicing of Request Message (48) via the Configuration Bus (10) shall be covered after the introduction of the Control Bus (12). Note that in FIG. 6 the Configuration Bus (10) functions are shown in the lower half of the object classes and another set of real time functions are shown in the upper half of the objects which interact via the Control Bus (12). A few real time functions are shared by the Control Bus (12) and the Configuration Bus (10), primarily those contained within the Producer Object and the Consumer Object since these common functions are also used to provide the real time Control Message interfaces to the Application Program (14) discussed later in this invention.

Control Bus

Figure 6:
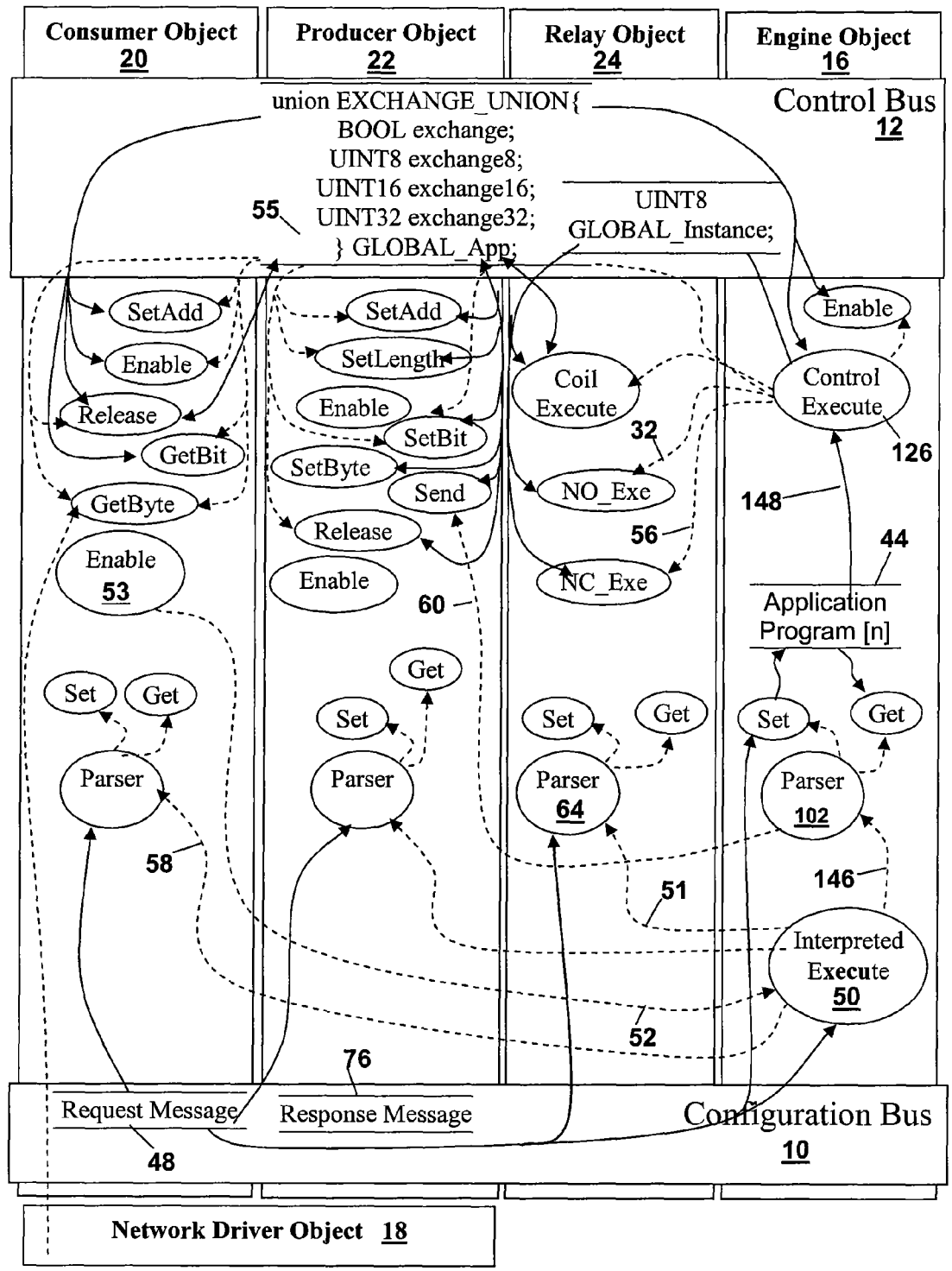
FIG. 6 is a high level data flow diagram utilizing the object interface buses utilized in the present invention and is a further decomposition of four of the software objects shown in the architecture model in FIG. 2.

The Engine Object (16) also has knowledge of all internal functions of the other software objects that are accessible via the Application Program (14) property of the Engine Object. Each real time internal function accessible by an Application Program (14) over the Control Bus (12) has a unique. Function Identifier. The preferred implementation varies based upon performance versus memory constraints, where this invention describes one memory efficient implementation where the Control Execute (126) function copies information within the Application Program (14) into shared memory locations referred to as the Control Bus (12). Similar to how a property of the Consumer Object (20) maintains the Request Message (48) in its memory, the Engine Object (12) maintains variables passed between Control Bus (12) functions in its memory. In FIG. 6 the Control Execute (126) function utilizes each internal Function Identifier read from the Application Program (14) to determine which real time function is to be executed over the Control Bus (12), indicated by the dashed lines to the NO_Execute (32) and NC_Execute (56). When the respective Control Bus (12) function executes, it usually retrieves its input value from the Control Bus memory location called GLOBAL_App (55) in this example and places its output value into the same Control Bus memory location. The next Control Bus (12) function generally retrieves the value deposited into the GLOBAL_App (55) Control Bus by the previously executed Control Bus function and repeats the process. In effect the variables passed between the Control Bus (12) real time functions are contiguously exchanged through the same shared memory locations until the thread of execution for the respective variables is complete, at which the time the process repeats. The implementation details may change based upon Control Apparatus requirements, however a common Control Bus (12) interface is provided for real time Control Bus functions.

The present invention includes a methodology by which the Control Bus (12) functions are assigned unique external numbers within each object class called a Function Identifier. In the preferred implementation, these external numbers are the same value for each function of each object class across all Control Apparatus and control systems that implement the object class and function. When an Element (instruction entry) is added to the Application Program (14) from the external network, over the Configuration Bus (10), the external Function Identifier may optionally be converted into a value optimized to the internal implementation requirements of the Control Apparatus. This present invention also includes a methodology where the content of the Application Program (14), when retrieved from the internal Application Program would translate the internal Function Identifier into the common external Function Identifier value.

Discussed in detail later, to provide network independence for Application Programs (14) the present invention includes common real time interface functions utilized across any supported network, where these common network interface functions are contained within the Producer Object (22) and Consumer Objects (20), which may be referenced within the Application Programs (14) itself, facilitating visible communication interfaces and behaviors for Control Messages, where the network behavior may be changed dynamically as defined within the Application Program. These network interface functions execute over the Control Bus (12) and should not be confused with the common interpreted network configuration dialogs which occur over the Configuration Bus (10), although they utilize the same Consumer (20) objects and Producer (22) objects. The present invention allows the user to create their own network behaviors within the Application Program (14) based upon the needs of the equipment being controlled or utilizes existing tested Application Program Components from a reusable Application Program Component Library or may modify the available Application Program Components as needed for the application task at hand. The following scenario is an overview of the addition of network interface functionality that would traditionally be contained in embedded firmware within a device.

For example, assume a Control Apparatus with limited memory needs to exchange control data with two fixed function devices. This is easily solved by creating a simple Application Program Component capable of scanning the two sensor devices then placing this Application Program in an architecture compliant Control Apparatus in order to simply and quickly achieve this scanning functionality. It should be noted that due to the limited memory in the Control Apparatus used in this example the Control Apparatus may only be able to support dialogs with a limited number of devices, but that limitation is sufficient for the equipment being controlled in this application domain scenario.

Existing Control Apparatus or System Architectures do not allow the network system behavior of a Control Apparatus to be entirely defined within a visible Application Program (14) much less enabling a low functionality Control Apparatus to scan existing traditional fixed function devices without the addition of device specific "scanner" firmware. This invention allows the internal operation of the Control Apparatus to be changed based upon the needs of the application domain, where the Control Apparatus behavior is solely limited by the available memory and object functions. In addition to core operational behaviors like the scanning functionality, this Control Apparatus invention also supports diagnostic functionality to be downloaded to the Application Program (14) when needed as described in the next example.

For example, assume a product supplier specifies that their sensor has a Mean Time Between Failure (MTBF) of one hundred thousand cycles. If it is desirable to determine when the device exceeds the MTBF value and may fail, an Application Program Component for tacking the actuation cycles of a control device may be copied from the Application Program Component Library in a corporate database or offered by a component vendor and pasted into the Application Program (14) of any Control Device requiring this functionality. This specific Application Program (14) is diagrammatically shown in FIG. 19 and is discussed in further detail later in this invention description. Within this invention the functionality of the Control Apparatus is determined by the objects contained within the Control Apparatus and the content of the Application Program (14) and is not fixed in product firmware as with traditional devices and new functions may be conveniently added from libraries providing generic content.

Configuration Bus Message Interface

Figure 7:
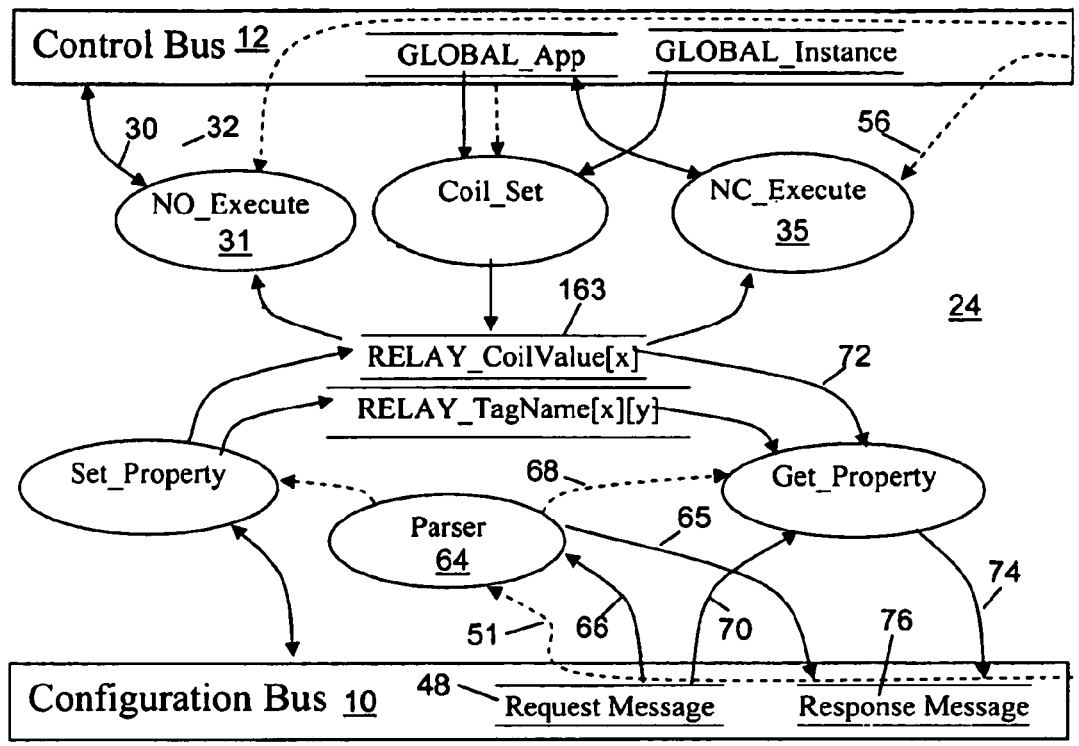
FIG. 7 is a detailed data flow diagram of a relay software object illustrating examples of the interfaces to the Control Bus and Configuration Bus in accordance with the present invention

FIG. 7 shows a decomposition of the related portions of one internal design for the Relay Object (24), where the three lower functions are related to servicing Configuration Bus (10) messages utilizing the traditional property editing paradigm and the three upper real time functions (31, 34, 35) interact via this inventions Control Bus (12) interface.

As shown in FIG. 6, upon consumption of an interpreted network message the Consumer Object (20) places the configuration Request Message (48) on the Configuration Bus (10) and informs the Engine Object (16) that a new Request Message has arrived. This implementation utilizes a Request Message (48) having the preferred object protocol which follows;
- (48) Request Message Protocol=
    Class_ID, Service_ID, Instance_ID, Property_ID, Service_Data Since this example discusses the Relay Object (24) class, the following message utilizing the prior protocol shall be used;
- (48) Request Message=
    CID_RELAY, SID_GET, 0, RELAY_PID_COIL_VALUE
    Or in hexadecimal;
    0x02, 0x01, 0x00, 0x02

For the network protocol used in this example each object class is identified using a unique number called the Class_ID. The same Class_ID number is used across all Control Apparatus containing the same externally accessible object class.

In this example the Engine Object (16) interprets the Class_ID value of 0x02 in the Request Message (48) determining that the Request Message is destined for the Relay Object (24) class. If the Class_ID is unknown to the Control Apparatus, this architecture invention requires an error response be sent indicating an unknown class error. This architecture contains rules relative to the order in which external request errors are determined and returned, facilitating the ability of a Tool Device (5) to dynamically determine the functions supported within a Control Apparatus based upon the error responses returned. As indicated in FIG. 6 the Engine Object (16) calls (51) the Parser (64) function of the Relay Object (24) class. As is further detailed in FIG. 7 the Parser (64) function within the Relay Object (24) class reads (66) the Service_ID from the Request Message (48) and if unknown places the appropriate unknown service error (65) into the Response Message (76). Since the SID_GET Service_ID is known to the Parser (64) function it calls (68) the Get_Property function. The Get_Property function then reads (70) the Instance_ID from the Request Message (48) and if invalid places the appropriate unknown instance error (74) into the Response Message (76). Since the Instance_ID is valid the Get_Property function then reads (70) the Property_ID value and if it is invalid places the appropriate unknown property error (74) into the Response Message (76). Since the Property_ID is valid and the Property_ID value indicates the RELAY_PID_COIL_VALUE is to be retrieved, the RELAY_CoilValue (163) property is read for the specified Instance_ID, thus it copies (72) its current value into (74) the Response Message (76), places a successful response Service_ID (74) in the Response Message (76) and returns (68) to the Parser (64) function. As indicated in FIG. 6 the Relay Object (24) Parser (64) function then returns (51) the Response Message (76) to the Engine Object (16).

Although various implementations are possible, in the preferred implementation the Parser functions of the various object classes and the associated Configuration Bus (10) interface functions that support the network Service_ID's for a specific object class would be contained in the object memory space for the related object class, in this case the Relay Object (24) class. In the preferred implementation, process related inventions require maintaining all object functions in a common source code file for ease of source code portability across platforms, for improved revision control system support of each object class used across Control Apparatus, for the ability to download new object classes to a Control Apparatus, as well as utilizing other System Bus (40) functionality discussed later. To achieve the network independence claim, when objects are interfaced to other networks, ideally only the Parser function and possibly the external Configuration Bus (10) interface service functions of each object class will require modification to support different external network protocols. Therefore when porting objects to other networks, the object properties and object Control Bus (12) functions shall not change nor will the external interface to the portable Application Programs (14).

The interface functions shown in the bottom half of FIG. 7 are solely involved in the configuration and diagnosis of an object via the Configuration Bus (10) but do not directly affect the normal internal real time operation of a Control Apparatus. The Control Bus (12) software object functions shown in the top half of FIG. 7 (31, 34, and 35) are representative of those real time functions present in typical software objects used to determine the internal operation of a Control Apparatus performed over the Control Bus (12).

Traditional control devices or object based network standards do not define an externally accessible real time function standard or a real time internal Control Bus (12). In fact, identified traditional object based architectures often place the "connection paths" between objects in object properties of some object classes, requiring addition of new object properties to existing object classes when new object relationships are required, again making application programs difficult to navigate even if all the objects had the appropriate connection paths added as well as spreading the object interactions into the individual object classes is common with all known object languages.

Control Bus Application Programs

Figure 8:
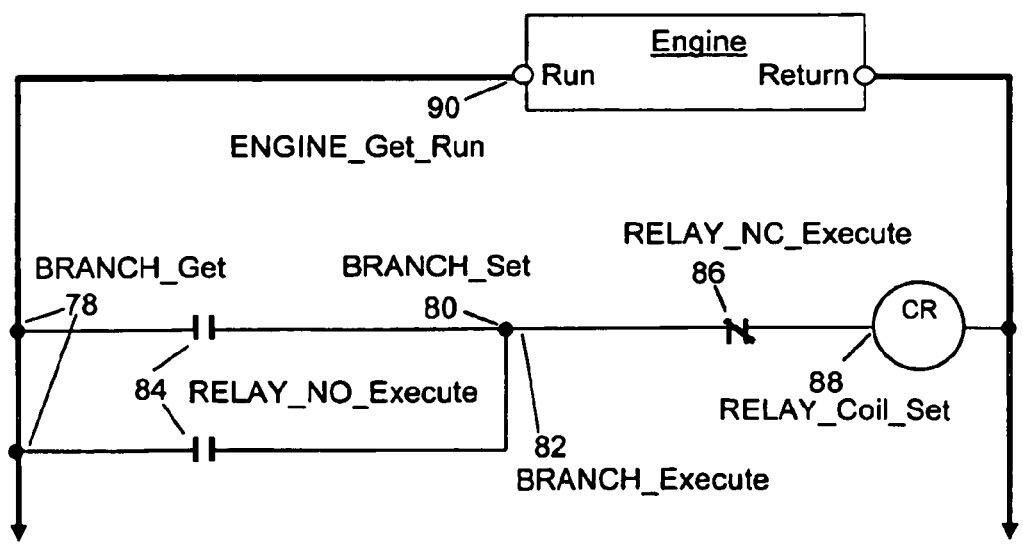
FIG. 8 is a schematic view of an application program constituting a mapping of selected object functions used in an application program and that provides a graphical representation of the application as it might appear on the display screen for a tool device in accordance with the present invention.

Common ladder logic icons are used to describe the interfaces to the Engine Object (16) relative to the Application Program (14) property. In FIG. 8 the Engine Object (16) is shown as a function block type of icon (90) which is somewhat analogous to a control transformer used in traditional hardwired relay ladder logic schematics, providing logical power to the remainder of the Application Program (14). The Branch Object (26) identified in FIG. 2 has some of its icons shown in FIG. 8, where a branch is defined as a point where logical wires or data wires interconnect, represented as a dot where wires intersect such as branch dots (78, 80).

The Control Bus (12) software object functions associated with the Branch Object (26) icons in FIG. 8 are the BRANCH_Get (78), the BRANCH_Set (80) and the BRANCH_Execute (82). The Control Bus (12) functions associated with the Relay Object (24) icons are RELAY_NO_Execute (84), the RELAY_NC_Execute (86) and RELAY_Coil_Set (88). The Control Bus (12) function associated with the Engine Object (16) is the ENGINE_Get_Run (90) function.

Figure 9:
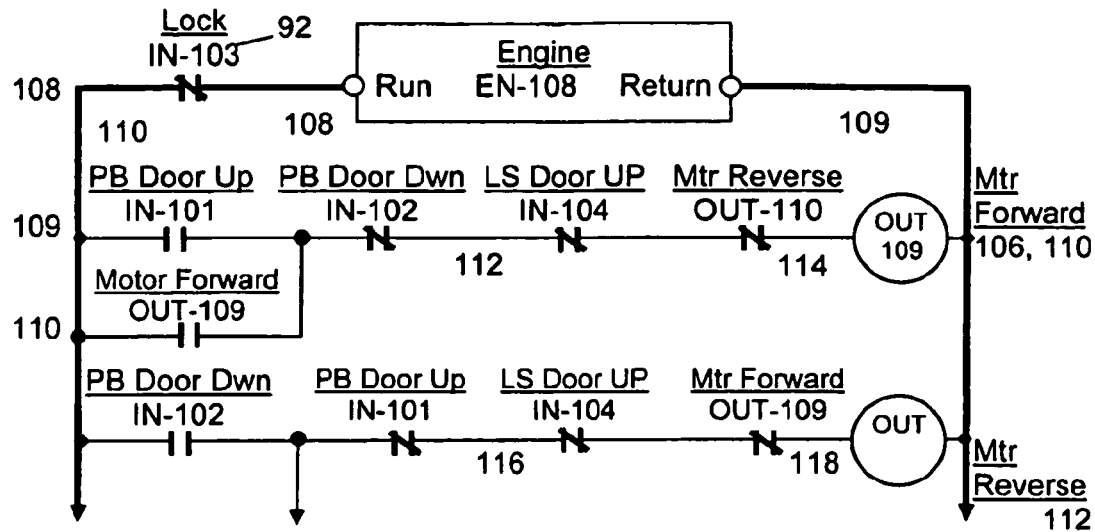
FIG. 9 is a schematic view of an application program for implementing the ability to read the application program within a device as well as support optional "tag name" property of the relay object class as it might appear on a display screen of a graphical tool device in accordance with the present invention.

The Application Program (14) example to be described is provided in FIG. 9 using the three core objects just introduced; the Engine Object (16), Branch Object (26) and Relay Object (24). Within the internal Application Program (14) property of the Engine Object (16), for the Application Program (14) shown in FIG. 9, in this implementation two bytes of memory would be consumed per instruction as shown in Table 1.

It should be noted that unlike traditional fixed function programmable logic devices object functions like the "Lock" (92) contact shown in FIG. 9 can be used to interrupt the flow of logical power to the Application Programs' (14) left rung or any other wire, without restriction.

No restrictions are placed on the Tool Device (4) relative to what graphical placement of Application Program (14) icons, as the creation of paradigms such as a left rung and right rung are entirely determined by the Tool Device (4) vendor and/or end user since the source of schematic wire power is determined by the application program in this case utilizing the Run status of the Engine Object (16). In fact due to the virtually unlimited Application Program (14) content ordering allowed, this invention allows a type of "free form" Application Program (14) creation totally unrestricted by the Control Apparatus. However, to facilitate explanation clarity the traditional left rung and right rung paradigm shall be used.

Internal Application Program Overview

The first byte (center column) in the internal Application Program (14) shown in Table 1 is the unique Control Bus (12) internal Function Identifier (FID) and the second byte (right column) is the Function Value associated with each Function Identifier. Remember the internal implementation is not directly visible through the Configuration Bus (10) but is provided below to demonstrate one Application Program (14) memory efficient implementation translation technique.

TABLE 1

| Element | Internal Function Identifier Pneumonic | Internal Function Value |
|---|---|---|
| [0] | FID_ENGINE_GET_RUN | 0 |
| [1] | FID_RELAY_NC_EXECUTE | RELAY_IN_103 |
| [2] | FID_BRANCH_SET | 0 |
| [3] | FID_RELAY_NO_EXECUTE | RELAY_IN_101 |
| [4] | FID_BRANCH_SET | 1 |
| [5] | FID_BRANCH_GET | 0 |
| [6] | FID_RELAY_NO_EXECUTE | RELAY_OUT_109 |
| [7] | FID_BRANCH_EXECUTE | 1 |
| [8] | FID_RELAY_NC_EXECUTE | RELAY_IN_102 |
| [9] | FID_RELAY_NC_EXECUTE | RELAY_IN_104 |
| [10] | FID_RELAY_NC_EXECUTE | RELAY_OUT_110 |
| [11] | FID_RELAY_COIL_SET | RELAY_OUT_109 |
| [12] | FID_BRANCH_GET | 0 |
| [13] | FID_RELAY_NO_EXECUTE | RELAY_IN_102 |
| ... | | |

Shown below is the string of byte values internal to the Control Apparatus that represent the Application Program (14) shown in a "human readable" format in Table 1 which is consistent with one graphical representation shown in FIG. 9, or two bytes per instruction.

7,0, 5,2, 1,0, 4,0, 1,1, 2,0, 4,5, 3,1, 5,1, 5,3, 5,6, 6,5, 2,0, 4,1,
For the Application Program (14) shown in FIG. 9, the Application Program (14) executes the schematic drawing starting at the FID_ENGINE_GET_RUN function, then the FID_RELAY_NC_EXECUTE function and then proceeds through the graphical schematic from left to right, top to bottom, satisfying all branch closes prior to proceeding to the right. More specifically the Application Program (14) shown in Table 1 executes in the order shown. When implementing the Control Apparatus firmware using the 'C' programming language, this implementation defined an ordered list for the Control Bus (12) internal Function Identifiers, similar to those shown in Table 2.

TABLE 2

| #define FID_ENGINE_END_OF_PROGRAM | 0x00 |
|---|---|
| #define FID_BRANCH_SET | 0x01 |
| #define FID_BRANCH_GET | 0x02 |
| #define FID_BRANCH_EXECUTE | 0x03 |
| #define FID_RELAY_NO_EXECUTE | 0x04 |
| #define FID_RELAY_NC_EXECUTE | 0x05 |
| #define FID_RELAY_COIL_SET | 0x06 |
| #define FID_ENGINE_GET_RUN | 0x07 |

The list of internal Function Identifier values shown in Table 2 are used internal to the Control Apparatus, where an internal Application Program (14) execution function, called Control Execute (126), uses these unique internal values to determine the internal real time Control Bus (12) function to be executed. Other Control Execute (126) implementations may use actual function call addresses as the internal Function Identifier, but this would consume more memory, not meeting the implementation criteria of this example.

To facilitate understanding of this example the following internal Instance Identifiers for this implementation of the Relay Object (24) class instances are included in Table 3;

TABLE 3

| #define RELAY_IN_101 | 0x00 |
|---|---|
| #define RELAY_IN_102 | 0x01 |

TABLE 3-continued

| | |
|---|---|
| #define RELAY_IN_103 | 0x02 |
| #define RELAY_IN_104 | 0x03 |
| #define RELAY_IN_105 | 0x04 |
| #define RELAY_OUT_109 | 0x05 |
| #define RELAY_OUT_110 | 0x06 |

The Instance Identifier name declarations shown in Table 3 generally reside within the source code used to implement the firmware for a Control Apparatus, primarily for those instances with fixed hardware interfaces requiring Device Drivers Objects where the Control Apparatus firmware directly references the object instances.

In the preferred implementation, the Control Bus (12) instructions contained internal to a Control Apparatus to implement the Application Program (14) are referenced externally over the Configuration Bus (10) using an implementation independent external object identifier typically composed of the Class_ID, Function_ID, and Function Value. Each Class_ID in this architecture is assigned a unique number that shall always be the same, independent of the Control Apparatus implementing the respective object class. The unique Class_ID for the object classes shown in FIG. 9 are listed in Table 4.

TABLE 4

| Class Pneumonic | Class ID |
|---|---|
| CID_BRANCH | 0 |
| CID_RELAY | 1 |
| CID_TIMED_RELAY | 2 |
| CID_SELECTOR | 3 |
| CID_PARAMETER | 4 |
| CID_COMPARATOR | 5 |
| CID_COUNTER | 6 |
| CID_DISPLAY | 7 |
| CID_TIME_OF_DAY | 8 |
| CID_PRODUCER | 9 |
| CID_CONSUMER | 10 |
| CID_DATA_BRANCH | 11 |
| CID_ENGINE | 12 |

This present invention assigns a unique external value to each internal real time function that may be used in the Application Programs (14) within the definition of each object class. Examples of some pertinent external real time Function Identifiers for the Relay Object (24) class are shown in Table 5;

TABLE 5

| External Function Identifier Pneumonic | Value |
|---|---|
| FID_RELAY_COIL_SET | 0 |
| FID_RELAY_NO_EXECUTE | 1 |
| FID_RELAY_NC_EXECUTE | 2 |
| FID_RELAY_DATA_NO_EXECUTE | 3 |
| FID_RELAY_DATA_NC_EXECUTE | 4 |

This present invention allows a Control Apparatus to contain externally accessible properties for each class that contain a list of the external Application Program (14) Function Identifiers supported within the Control Apparatus. This invention also allows the use of a recursive approach of setting all possible Function Identifier values within an Application Program (14) property of the Engine Object (16) class within a Control Apparatus where an error is detected internal to the Control Apparatus and where the detected error is used by the Tool Device (4) as a means of identifying which Function Identifiers a Control Apparatus does support and does not support. Although a Tool Device (4) should contain support for all the functions of any Control Apparatus it programs, a Control Apparatus is only required to support the functions determined necessary by the Control Apparatus vendor.

External real time Function Identifiers for the Branch Object (26) class supported by this Control Apparatus are shown in Table 6;

TABLE 6

| External Function Identifier Pneumonic | Value |
|---|---|
| FID_BRANCH_SET | 0 |
| FID_BRANCH_GET | 1 |
| FID_BRANCH_EXECUTE | 2 |

External real time Function Identifiers for the Engine Object (16) class supported by this Control Apparatus are shown in Table 7;

TABLE 7

| External Function Identifier Pneumonic | Value |
|---|---|
| FID_ENGINE_END_OF_PROGRAM | 0 |
| FID_ENGINE_SET_ACTIVE_INSTANCE | 1 |
| FID_ENGINE_GO_TO_INSTANCE | 2 |
| FID_ENGINE_GET_RUN | 3 |
| FID_ENGINE_VALIDATE | 4 |
| FID_ENGINE_EXECUTE | 5 |
| FID_ENGINE_SET_EXCHANGE | 6 |

Figure 12:
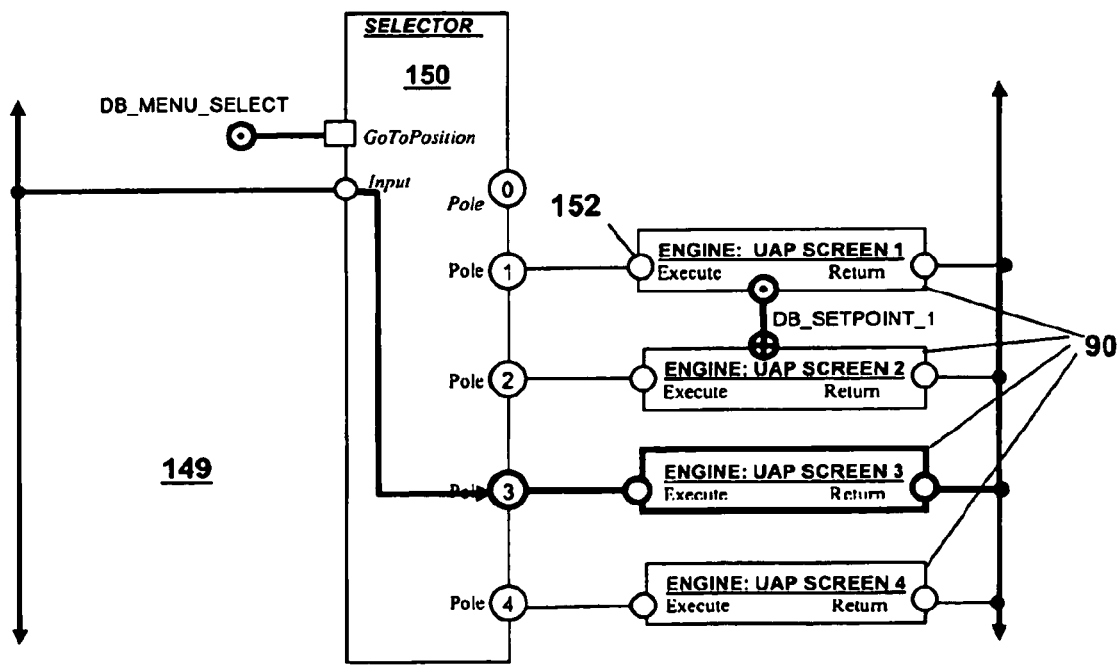
FIG. 12 is a schematic view of an application program for using a selector switch object to determine which one of four application programs within on device will execute based upon the position of the selector switch as it might appear on a display screen of a graphical tool device in accordance with this present invention

The Engine Object (16) in this invention includes a common external interface for what would traditionally be referred to as operating system functions, generally inaccessible and not visible to the external Tool Device (4) and Application Program (14). As shown in FIG. 12 and discussed later, the Engine Object (16) functions shown in Table 7 allow an Application Program (14) to be broken into smaller Application Programs (14) while maintaining visibility of the selected partitioning of Application Programs (14), interfaces between individual Application Programs (14) and including state of the Application Programs (14).

Figure 10:
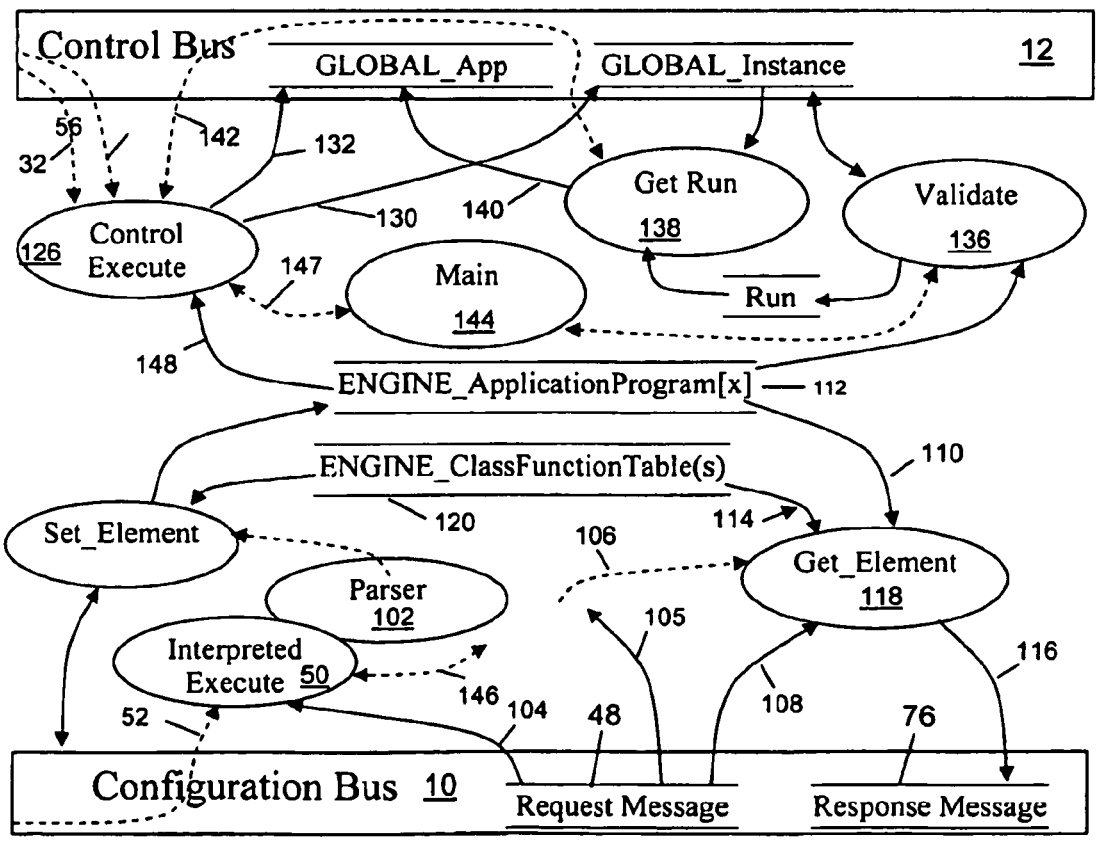
FIG. 10 is a detailed data flow diagram of the engine object indicating examples of one interface dialog with the Control Bus and one interface dialog with the Configuration Bus in accordance with the present invention.

As shown in FIG. 10 each Control Bus (12) Function Identifiers shown in Table 5, Table 6, and Table 7 may be included within a series of tables collectively referred to as the ENGINE_ClassFunctionTables (120) property of the Engine Object (16) class. When a Tool Device (4) reads the contents of the ENGINE_ApplicationProgram (112) property, the Engine Object (16) within this Control Apparatus converts the optimized internal Application Program (14) format in Table 1 into the common Control Apparatus independent external Application Program (14) format, shown in Table 9. Although various optimized implementations are possible, for clarity Table 8 contains an example of an ENGINE_ClassFunctionTable (120) property, which is an array of two variables; External Class_ID and External Function_ID, where the table element (offset into Table 8) is equal to the internal Function_ID used within the internal Application Program (14) shown in Table 1.

TABLE 8

| Element = Internal Function_ID | External Class_ID | External Function_ID |
|---|---|---|
| [0] | CID_ENGINE | FID_END_OF_PROGRAM |
| [1] | CID_BRANCH | FID_BRANCH_SET |
| [2] | CID_BRANCH | FID_BRANCH_GET |
| [3] | CID_BRANCH | FID_BRANCH_EXECUTE |
| [4] | CID_RELAY | FID_RELAY_NO_EXECUTE |
| [5] | CID_RELAY | FID_RELAY_NC_EXECUTE |
| [6] | CID_RELAY | FID_RELAY_COIL_SET |
| [7] | CID_ENGINE | FID_ENGINE_GET_RUN |

This architecture defines an "Element Identifier" to be an index or offset into an array of any simple or complex data type. For the implementation of a Engine Object (16) shown in FIG. 10, the ENGINE_ApplicationProgram (112) is generally read using a Get Element Request Message retrieving one Application Program (14) Element at a time. Although this invention allows various protocols to retrieve the common external Application Program (14) format from a Control Apparatus, the preferred protocol for the Get Element Request Message is shown below;

Get Element Request Message Application Protocol=
    Class_ID, Service_ID, Instance_ID, Property_ID, Element_ID, Element Count
Get Element Request Message (48)=
    CID_ENGINE, SID_GET_ELEMENT_REQUEST, Instance_ID, ENGINE_APPLICATION_PROGRAM, Element_ID, Element_Count
or in hexadecimal;
    0x0C, 0x03, 0x00, 0x06, 0x00, 0x01, As shown in FIG. 6 upon receipt of a Configuration Bus (10) Request Message (48) the Engine Object (16) Interpreted Execute (50) function would call (146) the Engine Parser (102). As shown in FIG. 10 Interpreted Execute (50) would then read (104) the valid CID_ENGINE Class_ID value to determine the Request Message (48) is destined for itself. As shown in FIG. 10 it would then invoke (146) the Parser (102) function which then reads (105) the valid Service_ID value of SID_GET_ELEMENT_REQUEST and invoke (106) the Get_Element (118) function. The Get_Element (118) function would read (108) the Request Message (48) and determine the request contains a valid Element_ID of zero, a valid Element Count of one, and a valid Property_ID for the ENGINE_ApplicationProgram (112) property. The Get_Element (118) function would then write (116) the Element Count of one to the following Get Element Response Message (76).

Get Element Response Message (76)=
    ResponseService, ElementCount, Class_ID, Function_ID, Function_Value
or
    SID_GET_ELEMENT_RESPONSE, 1, CID_ENGINE, FID_ENGINE_GET_RUN, 0,
or in hexadecimal;
    0x04, 0x01, 0x12, 0x03, 0x00

It would read (110) the first byte of the ENGINE_ApplicationProgram (112) property contents shown in Table 1 and determine Element zero contains the internal Function Identifier value of seven represented by FID_ENGINE_GET_RUN. It would use this internal Function Identifier value of seven to index into the ENGINE_ClassFunctionTable (120) whose contents are shown in Table 8, from which it would read (114) the Class_ID value of twelve for CID_ENGINE and external Function_ID value of three for FID_ENGINE_GET_RUN and places (116) these values in the Response Message (76). The Get_Element (118) function would then read (110) the internal Function Value for Element zero from the ENGINE_ApplicationProgram (112) property shown in Table 9 and determine it contains a value of zero placing (116) zero in the Function Value location of the Response Message (76). The Get_Element (118) function would then return (106) control to the Engine Object (16) Parser (102) function which would return (146) to the Interpreted Execute (50) function also shown in FIG. 6 which would invoke (60) the Send function of the interpreted message instance of the Producer Object (22) directly indicating the Response Message (76) is ready for transmission.

Upon receipt of the Response Message (76) the Tool Device (4) would repeat the request for all remaining Elements of the ENGINE_ApplicationProgram (112) until the "CID_ENGINE, FID_END_OF_PROGRAM, 0" is returned.

Table 9 is representative of the external implementation independent Application Program (14) returned to the Tool Device (4) over the Configuration Bus for the initial portion of the Application Program (14) shown in FIG. 9 utilizing three data bytes per Element; Class_ID, Function_ID, and Function_Value;

TABLE 9

12,3, 1,2,2, 0,0,0, 1,1,4, 0,0,1, 0,1,0, 1,1,5, 0,2,1, 1,2,1, 1,2,3, 1,2,6, 1,0,5, 0,1,0, 1,1,

| Element | External Class_ID | External Function_ID | External Function_Value |
|---|---|---|---|
| [0] | CID_ENGINE | FID_GET_RUN | 0 |
| [1] | CID_RELAY | FID_RELAY_NC_EXECUTE | IN_103 |
| [2] | CID_BRANCH | FID_BRANCH_SET | 0 |
| [3] | CID_RELAY | FID_RELAY_NO_EXECUTE | IN_101 |
| [4] | CID_BRANCH | FID_BRANCH_SET | 1 |
| [5] | CID_BRANCH | FID_BRANCH_GET | 0 |
| [6] | CID_RELAY | FID_RELAY_NO_EXECUTE | OUT_109 |
| [7] | CID_BRANCH | FID_BRANCH_EXECUTE | 1 |
| [8] | CID_RELAY | FID_RELAY_NC_EXECUTE | IN_102 |
| [9] | CID_RELAY | FID_RELAY_NC_EXECUTE | IN_104 |
| [10] | CID_RELAY | FID_RELAY_NC_EXECUTE | OUT_110 |
| [11] | CID_RELAY | FID_RELAY_COIL_SET | OUT_109 |
| [12] | CID_BRANCH | FID_BRANCH_GET | 0 |
| [13] | CID_RELAY | FID_RELAY_NO_EXECUTE | IN_102 |
| ... | | | |

It should be noted a Control Apparatus may be developed in any software programming language since the external Configuration Bus (10) interface is language independent and represented by a set of reserved numbers. The ability to utilize any available programming language to implement a Control Apparatus that supports this architecture is unlike other software approaches that utilize a common programming language like JAVA to achieve portability.

Figure 11:
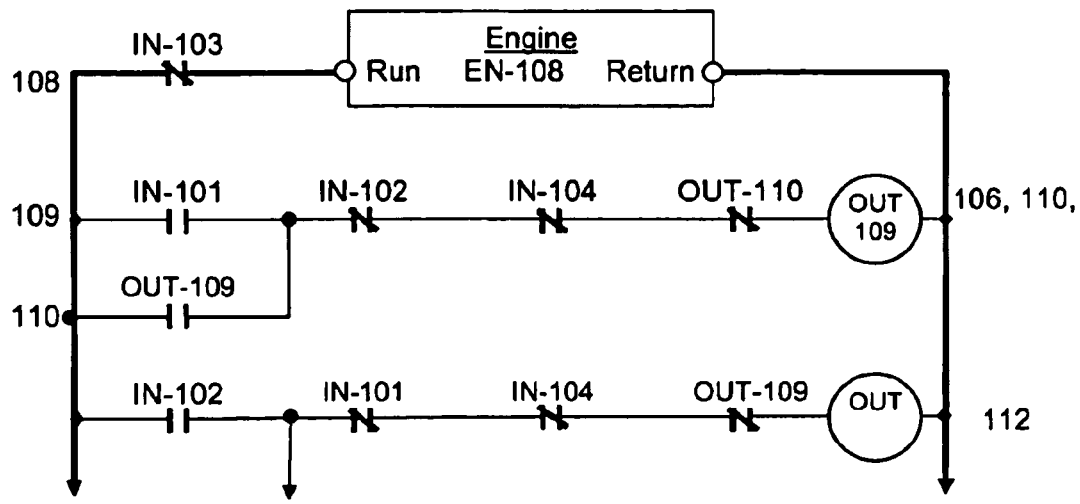
FIG. 11 is a schematic view of an application program for implementing the ability to read the application program within a device that does not support the optional "tag name" property of the relay object class as it might appear on a display screen of a graphical tool device in accordance with the present invention.

Since the Tool Device (4) has graphical icons defined for each Control Bus (12) Function Identifier for each Object Class, a graphical representation similar to that shown in FIG. 11 can now be displayed utilizing the external Application Program (14) retrieved and shown in Table 9. The Application Program (14) in FIG. 11 could be retrieved and displayed where the Tool Device (4) has no prior knowledge about the Control Apparatus from which it was retrieved, having never previously performed a dialog with this implementation of the Control Apparatus and without any form of electronic knowledge of this specific Control Apparatus having been previously provided, other then the common Control Apparatus architecture interfaces.

Based upon Tool Device (4) rules for a specific industry, in the example in FIG. 11 the Relay Object (24) class was assigned an instance reference name based up on the schematic line number on which its relay coil appears within the Tool Device (4) Application Program (14) window, per historical Joint Industrial Council schematic drawing rules. A complete view previously shown in FIG. 9 for a Control Apparatus can optionally support the Tag Name property in selected object classes, retrieved with an interpreted request message via the Configuration Bus (10), to further facilitate clarity of the Application Program (14) to the end user.

Utilizing the present invention does not require a Configuration Bus (10) interface or even a network interface within a Control Apparatus, when a Control Apparatus does not require external access to the Application Program (14) object properties. In these cases, only the required Control Bus (12) functions and required Control Bus object classes sufficient to achieve the application requirements are implemented within the Control Apparatus and all Configuration Bus (10) functions are removed. This invention allows Application Program (14) development to be performed on a full featured communicating Control Apparatus, and once the Application Program (14) is sufficiently tested to meet requirements, all Configuration Bus (10) interface functions (code) may be removed from the final Control Apparatus where the debugged Application Program remains intact, as tested. As is common in the art, this architecture allows the downloading of new functions for an existing object class or a new object class and associated functions into a Control Apparatus. This invention claims the registration of these Application Program (14) functions using a common external Function Identifier to be used across all Control Apparatus supporting the respective function for the respective object class.

Other enterprise level inventions include the registration of these same external Function Identifiers into an architecture database for reuse across multiple Control Apparatus after passing various object testing and registration criteria.

For purposes of "common interface clarity" the preferred Application Program (14) passes values between the Control Bus (12) functions in global variables from which, and into which, execution variables are exchanged over the Control Bus. A typical declaration for the exchange of two values between the real time functions over the Control Bus (12) in a low functionality Control Apparatus utilizing 'C' programming language is shown below;

```
union EXCHANGE_UNION {
    BOOL exchange;
    UINT8 exchange8;
    UINT16 exchange16;
    UINT32 exchange32;
} GLOBAL_App;
UINT8 GLOBAL_Instance;
```

The data types and number of Control Bus (12) variables supported by a specific Control Apparatus is implementation dependent and based upon the needs of the real time functions supported by the object classes contained within the specific Control Apparatus. However, to provide a common interface over which internal real time Control Bus functions interact requires a common internal object protocol, where one efficient implementation is shown in the upper half of FIG. 6. Although not true for all Control Bus (12) functions, in the majority of cases the value returned from one Control Bus function is the input value to the next Control Bus function, where the value passed is placed in the same GLOBAL_App memory location.

As shown in FIG. 10, in the simplest implementation, the Control Execute (126) function within the Engine Object (16), which is responsible for executing the Application Program (14), is usually called (147) from the traditional 'C' language Main (144) function. The Control Execute (126) function, for this implementation, reads (148) the Function Value in the ENGINE Application Program (112) property and copies (130) the Function Value into GLOBAL_Instance. In the case of the first Element of the ENGINE Application Program (112) shown in Table 1 the Function Value is zero. The Control Execute (126) function then reads (148) the internal Function Identifier value from the ENGINE_ApplicationProgram (112), in this case the value is seven representing the FID_ENGINE_GET_RUN function, and the Control Execute (126) function uses this value in a "jump table" to determine the respective function address to execute.

Since the first Control Bus (12) function is the Get Run (138) function within the Engine Object (16) the Control Execute (126) function invokes (142) the Get Run function. The Get Run (138) function reads the value from GLOBAL_Instance, which is zero since this Control Apparatus supports a single Application Program (14). The Get Run function (138) then reads a TRUE value from its Run property for instance zero and places (140) its value in the GLOBAL_App Control Bus (12) variable. Although discussed later the Engine Object (16) Validate (136) function previously determined that the contents of the ENGINE_ApplicationProgram (112) are valid and thus the Run property would have therefore been previously set to TRUE. Had the ENGINE_ApplicationProgram (112) been invalid a FALSE would have been placed in the Run property, which would effectively disable the ENGINE_ApplicationProgram (112) actions by removing logical power for the left rung in this example.

The Get Run function (138) then returns (142) to the Engine Object (16) Control Execute (126) function. The Control Execute (126) function retrieves (148) the next element's Function Value from the ENGINE_ApplicationProgram (112) shown in Table 1 and copies (130) the Function Value of three into GLOBAL_Instance. The Control Execute (126) function then retrieves (148) the Control Bus (12) internal Function Identifier from Table 1, in this case an FID_RELAY_NC_EXECUTE value of five, and uses this value in its jump table to invoke (56) the Relay Object (24) NC_Execute (35) function shown in FIG. 7. Typical 'C' code for this NC_Execute (35) function implementation follows;

```
void RELAY_NCExecute(void) {
    GLOBAL_App.exchange =
    !RELAY_CoilValue[GLOBAL_Instance] &&
    GLOBAL_App.exchange;
}
```

As indicated by the code example, the NC Execute (35) function shall use the TRUE value previously placed in GLOBAL_App by the Get Run (138) function and place the result into GLOBAL_App. If the RELAY_CoilValue (163) property of the "Lock" (92) instance of the Relay Object (24) in FIG. 9 is FALSE GLOBAL_App will remain TRUE, else it will be set to FALSE.

Upon return (56) to the Engine Object (16) Control Execute (126) function in FIG. 10, the next Function Value of zero is read (148) from Element two of the ENGINE_ApplicationProgram (112) in Table 1 and places (130) this value in GLOBAL_Instance then Control Execute (126) retrieves (148) the internal Function Identifier value of one from Table 1 for the FID_BRANCH_SET from Element two of the ENGINE_ApplicationProgram (112). The Control Execute (126) again uses the internal Function Identifier value in its jump table to execute the BRANCH_Set function. Typical code for a Branch Set function follows;

```
void BRANCH_Set(void) {
    BRANCH_Value[GLOBAL_Instance] = GLOBAL_App.exchange;
}
```

Upon return from the Branch Set function the Engine Object (16) Control Execute (126) function reads (148) element three from the Application Program (14) in Table 1 whose value is zero for the, INPUT_IN-101 Function Value and places this value into GLOBAL_Instance. It then reads (148) the internal Function Identifier value four for FID_RELAY_NO_EXECUTE and then invokes (32) the appropriate execution as shown in FIG. 6. As shown in the Relay Object (24) in FIG. 7 a typical Normally Open Execute (31) Control Bus function for this implementation follows;

```
void RELAY_NO_Execute(void) {
    GLOBAL_App.exchange =
    RELAY_CoilValue[GLOBAL_Instance] &&
    GLOBAL_App.exchange;
}
```

As shown in the code example, the value in GLOBAL_Instance is used to index into the appropriate element of the RELAY_CoilValue (163) property values, and GLOBAL_App is compared with the state of RELAY_CoilValue (163) for the GLOBAL_Instance to determine the value placed in GLOBAL_App. If the input into the normally open contact contained in GLOBAL_App is TRUE and the RELAY_CoilValue[GLOBAL_Instance] is TRUE, then a TRUE is returned in GLOBAL_App, else a FALSE is placed in GLOBAL_App.

Upon return (32) the Control Execute (126) function again reads (148) the next element's internal Function Value and copies (130) it to GLOBAL_Instance and reads (148) the internal Function Identifier from the ENGINE_ApplicationProgram (112) and uses it as an index into the jump table to execute the next respective Control Bus (12) internal function. This retrieve and execute continues until the END_OF_PROGRAM internal Function Identifier is read (148), which results in a return from the Engine Object (16) Control Execute (126) function, returning to program "Main" in this case.

Although the prior example described a totally sequential Application Program (14) execution, optional Control Bus (12) functions, some of which were listed in Table 7, may reside within the Engine Object (16) that allows program execution to jump to different locations within the current Application Program (14) instance, call other instances of the Application Programs (14), allows the execution of an Application Program (14) initiated by an asynchronous interrupt event and so forth. This invention allows one or more instances of an Application Program (14) to define the internal operation of the Control Apparatus where the Engine Object (16) icons are provided within the graphical Application Program (14) to conditionally manage and view their execution. The Application Program (14) shown in FIG. 12 diagrams how one instance of the Engine Object (16) utilizes conditional logic to activate the Execute (152) function for other instances of an Engine Object (90).

Referring now to FIG. 12 the Selector Switch (150) object has each output "Pole" connected to the Execute (152) function of a different Application Program (90) within the Primary Application Program (149). By changing the position of the Selector Switch (150) a different Application Program (90) is executed. Obviously any desired logic may be used to manage the execution of the Application Programs (90) where the sample Primary Application Program (149) demonstrates a "one of many" selection useful in the multiple display screen applications for Human Interface Actuators (1).

Figure 13:
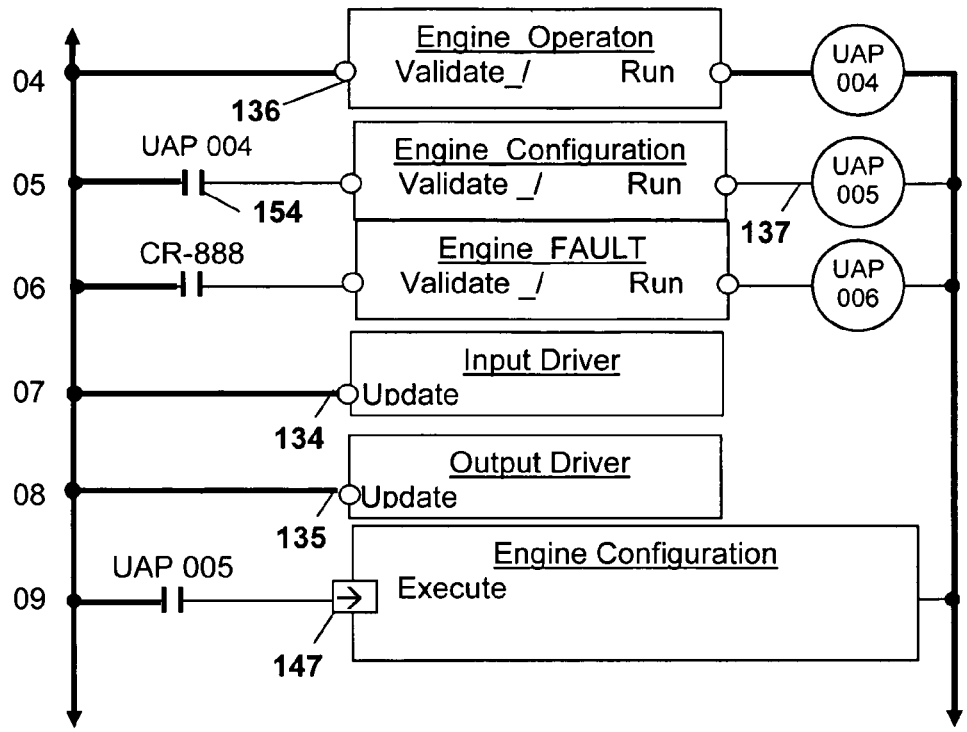
FIG. 13 is a schematic view of an application program for ing a target device containing an application program supporting multiple instances of the engine object and where the application program contains engine object functions used to validate the contents of the application program property of each instance of the engine object and uses the status of the validation check to control the execution of dependent application programs as it might appear on a display screen of a graphical tool device in accordance with the present invention.

Referring now to FIG. 13 three instances of the Engine Object (16) conditionally receive a TRUE at their Validate (136) function where each instance indicates via their Run value when the contents of each instance is valid or invalid. Upon detection of a rising edge at its Validate (136) input, the contents of the ENGINE_ApplicationProgram (112) property for the respective instance of Engine Object (16) are checked to verify all Control Bus (12) internal Function Identifier elements are valid and that the Function Value(s) following the internal Function Identifiers are also valid. If all elements are valid the Run property of the Engine Object (16) instance shall be set to TRUE, else it shall be FALSE. In FIG. 13 the execution condition for the instance of Engine Object (16) shown on logic line 05 indicates the UAP_004 contact (154) must be closed for "Engine Configuration" Application Program (14) to be validated. Until successful validation is achieved as indicated by UAP_005 (137) going TRUE, which in turn shall close one of its virtual normally open contacts on line 09 thus applying a TRUE to the Execute (147) function, the "Engine Configuration" instance of the Engine Object (16) will not execute. Additionally note that on line 07 the Update (134) function of the Input Driver Object is executed, updating the local embedded input relays and on line 08 the Update (135) function of the Output Driver Object is executed, updating the local embedded outputs associated with the output relay instances. Although other driver objects may provided real time function access to the Application Program (14), this example identifies the extremely finite control of even the hardware device drivers provided by this Control Apparatus architecture enabling users to view and modify the internal operation of the Control Apparatus.

It should be noted that the Run property is exiting the right side of the Engine Object (16) Icon in FIG. 13 and exited the left side of the Engine Object (16) Icon in the Application Program (14) shown in FIG. 11. The present invention allows placement of the interfaces to any Function Identifier supported by an Object Class to be located anywhere on an icon and moved to any location on an icon during programming. This is one method of graphically enforcing a desired execution order of an Application Program (14). Other techniques used to alter the execution order of an Application Program (14) are discussed later in this invention. The present invention allows the display of only the function interfaces used within the Application Program (14), where the same instance of an object may be shown at multiple locations across multiple Application Programs (14) when desired. Since this invention also allows determination of the Function Identifiers supported by a specific Control Apparatus it thus enables the Tool Device (4) to display and or restrict the usage of only functions supported by a Control Apparatus and only allowing display and/or terminations to object icon interfaces supported by the Control Apparatus' being configured.

The present invention allows the user to determine which Application Programs (14) run, and when they run, utilizing the same external interfaces and Tool Device (4) interfaces as is used to manage any other object class using the objects Application Program (14) functions.

Tool Architecture

As shown in FIG. 5, to achieve the common system architecture, in addition to a tool's version of Configuration Bus (10) and a Control Bus (12) within the Control Apparatus, this invention includes a Tool Bus (38) and a System Bus (40). In the preferred implementation, the Tool Configuration Bus (34) provides additional functions required by a requester Tool Device (4) to interact with any compliant responder Control Apparatus. The Tool Control Bus (36) contains all the real time Control Bus (10) functions contained within a Control Apparatus in addition to supporting its own instances of these objects as well as instances for all Control Apparatus and Tool Devices to which it is interacting. Tool Bus (38) functions provided "substitution functions" for the Control Bus (12) functions and additional functions required by a Tool Device to perform necessary operations. The Tool Bus (38) is a superset of the Tool Control Bus (36) where Tool Application Programs (44) executing over the Tool Control Bus (36) are intended to be equivalent to those contained within the Control Apparatus, where Tool Application Programs (44) executed over the Tool Bus (38) may contain additional functions not contained within the Control Apparatus Application Program (14). Unless specified otherwise utilizing a unique reference number, in this description when the Tool Application Program (44) is referenced using the value 44 it is referencing multiple instances of various application programs contained within the Tool Device (4). Simply stated, each instance of the Application Program (14) contained within each Control Apparatus is copied into one instance of a Proxy Application Program (44) on the Tool Control Bus (36) within the Tool Device (4), where the Proxy Application Program (44) within the Tool Device (4) contains equivalent content to the Application Program (14) in the Control Apparatus. Additional instances of the modified Application Programs (44) may be created within the Tool Device (4) beyond the Proxy Application Program (44) for purposes of providing additional Tool Device (4) functionality where the functions within these additional Application Programs (44) are not always equivalent to those within the Control Apparatus, and are thus contained within separate instances of the Application Program (44) within the Tool Device (4). System Bus (40) is a superset of Tool Configuration Bus (34) utilized to perform dialogs with other Tool Devices (4) and general purpose computers (2 and 6). As indicated in FIG. 5 the Tool Device (4) minimally contains all the object classes contained within the target Control Apparatus and minimally contains functions to acquire all the object properties of each object class from the Control Apparatus.

For example, where a configuration Tool Device (4) is required to display the Proxy Application Programs (14) extracted from within the Control Apparatus, the respective object classes within the Tool Device (4) would also include Tool Bus (38) software object functions to display icons for graphically representing the various Control Bus (12) functions contained within a Control Apparatus. As shown in FIG. 5, like the Configuration Bus (10) and Control Bus (12) described for a Control Apparatus, the Tool Bus (38) also intersects all the object classes. In the preferred implementation, various Tool Bus (38) functions are used in displaying ranges of different application domain specific icons, similar to those previously referenced in FIG. 11 (for example, contact and coil icons). Specifically, the icons displayed on a support Tool Device (4) for home automation applications, such as house wiring, may vary from the icons that would be displayed in an industrial controls application, which may vary from the icons displayed for a vehicle application, which may vary form those used in a chemical processing plant and so forth.

The present System Architecture invention allows the separation of the iconic tool view of a system provided by the Tool Device (4) from the common Control Bus (12) functions contained in a Control Apparatus and from the internal implementation interfaces used within the Control Apparatus executing the Application Programs (14). This invention includes a software architecture within the software Tool Device (4) that is a superset of the architecture within the Control Apparatus, where the software Tool Device has the ability to display, navigate and modify Application Programs (14) throughout the system as well as create Tool Utility Application Programs (44) that provide tool functions utilizing a superset of the Control Apparatus execution engine within a Tool Device. The present Tool Device Architecture invention allows creation of Tool. Application Programs composed of Tool Control Bus (36) software object functions, Tool Bus (38) functions, and System Bus (40) functions to create new Tool Application Programs (14) that can be used for testing, diagnostics and simulation both on an apparatus and system level.

In the preferred implementation, system navigation is accomplished within the Tool Device (4) by replicating values of selected properties of instances of monitored object classes within Application Programs of selected Control Apparatus within proxy instances of the object classes within the Tool Device. As represented by the "dashed line" shown in FIG. 14, prior to providing support functions, a software Tool Device (4) retrieves the contents of the targeted Application Program (14) property from the Engine Object (16) of the Control Apparatus' (155) and places a copy in an instance of an internal Proxy Application Program (44) property within Tool Device memory for this specific Control Apparatus (155). The Tool Device (4) may repeat this operation except for Control Apparatus (156) while creating another internal Proxy Application Program (44) property for its contents. The software within the Tool Device (4) supports a superset of the object architecture within the Control Apparatus (155 and 156) where the Tool Device may execute the Proxy Application Programs (44) over the local Tool Control Bus (36) for simulation purposes. Obviously the Tool Device (4) may support all the Control Bus (12) functions contained within the various Control Apparatus within the system in addition to other needed Tool Control Bus (36) functions. Based upon internal object functions within the Tool Device (4), portions of the Control Bus (12) functions from the Control Apparatus (155 and 156) may be displayed in the Tool Device window using alternate application domain specific Tool Bus (38) functions (160, 162 and 164) similar to those shown in FIG. 15. As highlighted by the icons on the Display_NO_Execute (160) function in FIG. 15 each function state within a Control Apparatus may be represented by different graphical icon representations on the display screen of the Tool Device (4).

The software Tool Device (4) retrieves the desired Application Programs (14) from the desired Control Apparatus' (155 and 156) over the Tool Configuration Bus (34) places their contents in instances of the Proxy Application Program (44) residing on the Tool Device's Tool Control Bus (36), the Tool Device monitoring software shall then substitute Tool Control Bus functions for each Proxy Application Program (14) Control Bus (12) function retrieved from the Control Apparatus into instance of the "Tool Display Application Program". A typical substitution for one Proxy Application Program (44) shown in Table 9 is the Tool Display Application Program (44) shown in Table 10, which is used for display purposes;

tem Function Values are listed with human readable names versus numbers in the "Instance" column. The Tool Display Application Program can conceptually be viewed as a kind of mirror image of the Proxy Application Program (44) retrieved from the Control Apparatus except its purpose is interacting with the user during application program development within the Tool Device (4).

The prior substitutions shown in Table 10 look nearly equivalent to the original Application Program (14) except Tool Bus (38) display functions such as functions 160, 162 and 164 replace the normal Application Programs' real time execution functions retrieved from the Control Apparatus (155 and 156), which in this case, are graphical display functions. This is an extremely efficient substitution and very simple operation to perform within a Tool Device (4), where each alternate display function is minimally determined based upon the Class ID, Function ID and Function Value retrieved from any Control Apparatus, and where this substitution is completely independent of the implementation utilized within the Control Apparatus. The values shown in the right column of Table 10 are the instances contained within the Control Apparatus (155) from which the Tool Display Application Program (44) was created, which are different instances than those internally referenced instances within the Tool Bus (38) Tool Display Application Program (44).

TABLE 10

| | Tool Display Application Program | | Control Apparatus |
|---|---|---|---|
| Element | Internal Function Identifier | Instance | Instance |
| [0] | FID_ENGINE_DISPLAY_GET_RUN | EN-5 | 0 |
| [1] | FID_RELAY_DISPLAY_NC_EXECUTE | CR_42 | RELAY_IN_103 |
| [2] | FID_BRANCH_DISPLAY_SET | 100 | 0 |
| [3] | FID_RELAY_DISPLAY_NO_EXECUTE | CR_41 | RELAY_IN_101 |
| [4] | FID_BRANCH_DISPLAY_SET | 101 | 1 |
| [5] | FID_BRANCH_DISPLAY_GET | 100 | 0 |
| [6] | FID_RELAY_DISPLAY_NO_EXECUTE | CR-49 | RELAY_IN_109 |
| [7] | FID_RELAY_DISPLAY_NC_EXECUTE | CR-42 | RELAY_IN_102 |
| [8] | FID_RELAY_DISPLAY_NC_EXECUTE | CR-44 | RELAY_IN_104 |
| [9] | FID_RELAY_DISPLAY_NC_EXECUTE | CR-50 | RELAY_OUT_110 |
| [10] | FID_RELAY_DISPLAY_COIL_SET | CR-49 | RELAY_OUT_109 |
| [11] | FID_BRANCH_DISPLAY_GET | 100 | 0 |
| [12] | FID_RELAY_DISPLAY_NO_EXECUTE | CR-42 | RELAY_IN_102 |

In the preferred implementation, the Tool Display Application Program (44) shown in Table 10 is a different application program then the one retrieved from the Control Apparatus (155 and 156) and placed in an instance of the Proxy Application Programs (44).

Figure 15:
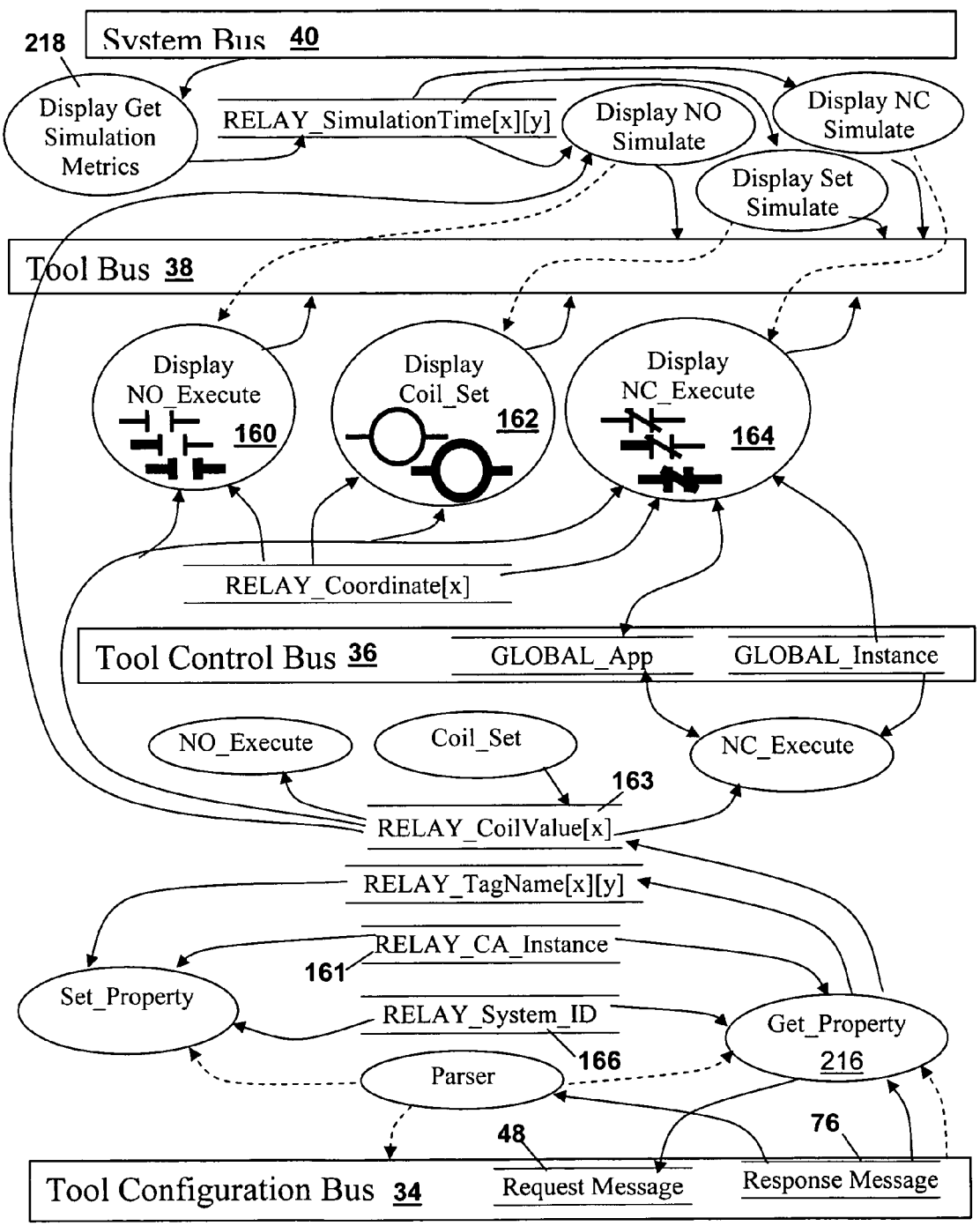
FIG. 15 is a data flow diagram of the representative relay object class within the tool device indicating some added functions utilized to animate objects on the display screen to enable schematic views when implementing the tool architecture in accordance with this invention

For example, since element one of Table 9 contains "CID_RELAY, FID_RELAY_NC_EXECUTE, IN_103" the Tool Device (4) Display Program Converter function on the Tool Bus (38) would determine the Tool Bus internal Function Identifier for the "CID_RELAY, FID_RELAY_NC_EXECUTE" is the Display_NC_Execute (164) function shown in FIG. 15 and would place its Tool Bus internal Function Identifier value in the Tool Display Application Program. The Display Program Converter function would then assign a Tool Bus (38) System Function Value for "IN_103" and place its value in the Tool Display Application Program. The Proxy Application Programs contain Function Values (instances) equivalent to those retrieved from the Control Apparatus. The Tool Display Application Program maintains a "System Function Value", which is a unique within the Tool Device (4) and unique to all Control Apparatus in the system to which the Tool Device is currently communicating and maintaining Proxy Application Programs. In Table 10 these unique Sys- As shown in FIG. 15, when each object class instance is created within the Tool Device (4) an additional RELAY_CA_Instance (161) property is set to the Control Apparatus Function Value (usually instance) for each element of the Proxy Application Program (44) and a RELAY_System_ID (166) property is set to a unique value for each device being referenced within the Tool Device (4). This System Identifier is provided for reasons of efficiency within the Tool Device (4) as well as providing an efficient means of navigating dialogs with the various Control Apparatus. The present invention defines a Tool Device Architecture that simultaneously supports monitoring instance identifiers of the same Class Identifier from multiple Control Apparatus at the same time, providing a System Programming paradigm, versus the traditional device programming paradigm. Within the Tool Device (4) implementation, properties of each instance of each object class are generally contained within an array of properties for the respective Class Identifier. This approach provides rapid access to object properties, and therefore requires that a unique instance identifier and system identifier be assigned in the Tool Device (4) for each instance of an object class within any Control Apparatus currently being referenced within the Tool Device software.

Figure 14:
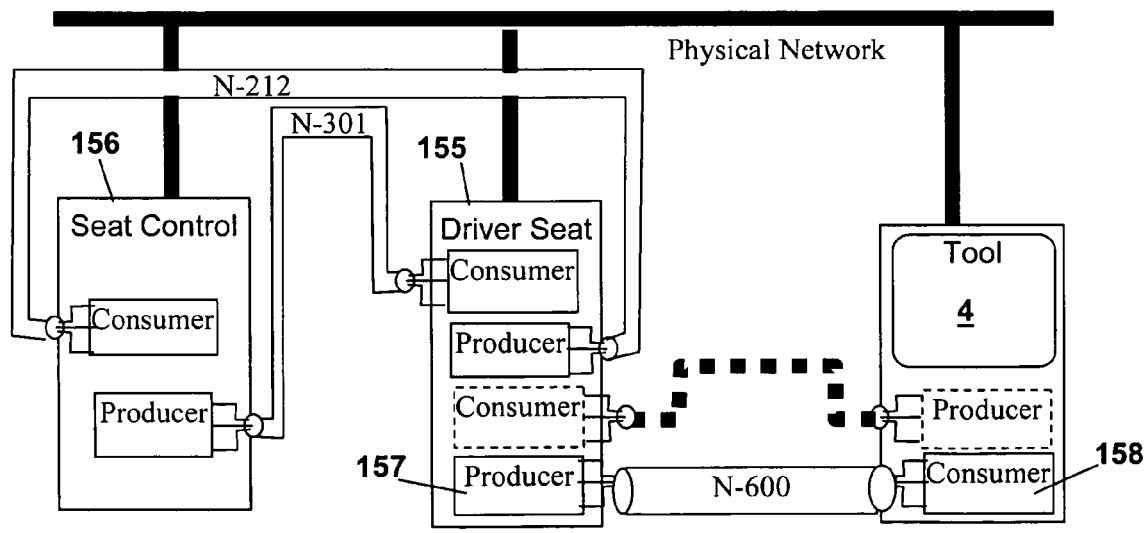
FIG. 14 is a system view of a driver seat control system showing one graphical representation of network message interconnects as it might be displayed on a tool device in accordance with this invention

More specifically, in FIG. 14 the Seat Control (156) Control Apparatus may contain an instance number one of the Relay Object (24) class, and the Driver Seat (155) Control Apparatus may also contain an instance number one of the Relay Object (24) class and the Tool Device (4) may also contain an instance number one of the Relay Object (24) class, all of which are totally unique within the system. The Tool Device (4) therefore provides a unique proxy Tool Bus (38) instance within its memory for each instance of each class within each Control Apparatus (4, 155 and 156). The Control Apparatus instance identifier RELAY_CA_Instance (161) is used by the Tool Device (4) when interacting directly with the Control Apparatus and the tools internal instance identifier is used for interactions over the various buses within the Tool Device (4).

Although various implementation approaches are possible, in the preferred Tool Bus (38) implementation a RELAY_System ID (166) property referenced in FIG. 15 is a property contained within each instance of each class within the Tool Device (4). The RELAY_System ID (166) property contains a value which is typically a unique instance of the Control Apparatus Container Object assigned to each Control Apparatus (4, 155, 156) currently being referenced within the Tool Device (4) software. The RELAY_System ID (166) is then used whenever the Tool Device (4) performs external operations over the Tool Configuration Bus (34) with the actual Control Apparatus (155 or 156). The Container Object instance is generally used to manage communications activities with each Control Apparatus and contains a Control Apparatus' network address and so forth.

Figure 16:
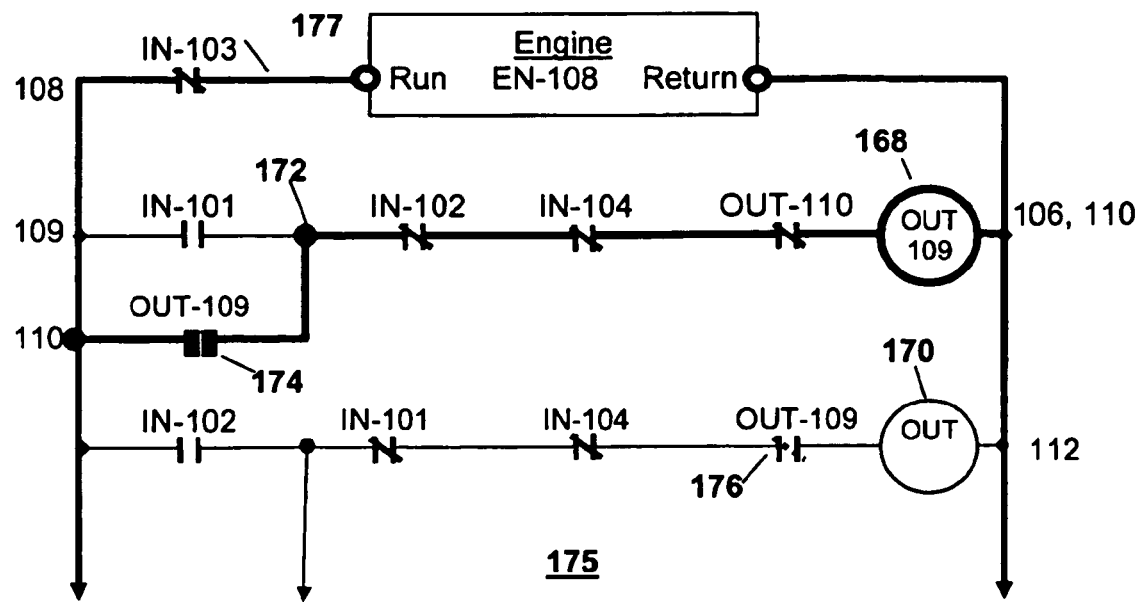
FIG. 16 is an animated schematic view of a portion of an application program used to illustrate the type and amount of information need by a tool device to convey the state of a portion of an application program as it might appear on a display screen of a graphical tool device in accordance with this invention

As indicated in FIG. 16, typical Tool Bus (38) functions include functions that display different icons based upon the state of the software object they are derived from. The most common object class shared across applications and industries is the Relay Object (24). For example, shown in FIG. 16 the Tool Device (4) displays the icons for two Relay Coils (168 and 170) representing the states of the output relays and the contact states for ten instances of various relay contacts (IN-103, IN-101, IN-102, IN-104). The highlighting (172) of the various interconnecting wires provide an intuitive view of the state of the various objects and the value of the information being passed between these objects, either true or false in this case.

For a Tool Device (4) to display a highlighted active Relay Object (24) coil icon (168) versus one that is not active (170) requires a Tool Device (4) to acquire the current state of the RELAY_CoilValue (163) property shown in FIG. 7 for the respective object instance from the Control Apparatus (155) containing the specific instance of the RELAY_CoilValue (163) properties shown in FIG. 16. This could be accomplished by sending the previously discussed interpreted Request Message (48) to the Control Apparatus containing the Class_ID to be read, the respective Property_ID for the RELAY_CoilValue and the respective Instance_ID, as shown below;

Relay Get Coil Value Property Request Message (48)=
    CID_RELAY, SID_GET_PROPERTY, OUT_109, RELAY_PID_COIL_VALUE
Or in hexadecimal
    0x01, 0x07, 0x05, 0x02

The apparatus would return a successful Response Message (76) containing the state of the coil, in this case a TRUE, as shown below;

Relay Get Coil Value Property Response Message (76)=
    SID_GET_RESPONSE, TRUE
or in hexadecimal
    0x08, 0x01

As shown in FIG. 15, having acquired a Response Message (76) the Get Property (216) function copies the TRUE value into the RELAY_CoilValue (163) property. When element eleven of the Tool Display Application Program shown in Table 10 executes the state of the first Relay Coil (168) icon will be updated when the Display_Coil_Set (162) Tool Bus (38) function in FIG. 15 is executed. As shown in FIG. 16 a typical icon displayed when a normally open relay contact is closed is to highlight the contacts (174). An icon used when a normally closed relay contact is open is to not highlight the contacts and lighten the line diagonally crossing the contacts or optionally includes changing the diagonal line with a diagonal dashed line (176). Although acquiring one Relay Coil property value is sufficient to update three icons (168, 174, 176) for OUT-109 in FIG. 16 it is not sufficient to completely highlight all the icons and interconnecting wires shown in FIG. 16. If read individually, six additional request messages and six additional response messages would be required to acquire the state of the other six Relay Object (24) instances with contact icons displayed in FIG. 16 and another message pair to retrieve the state of the Engine Object Run (177) property. Getting the value of one property at a time is not only time consuming on the network, but also requires considerable CPU execution time within the target Control Apparatus to service each interpreted Request Message (48). Additionally, since retrieving one object property per execution of the Application Program. (14) within the Control Apparatus is typical, it is thus nearly impossible to acquire all object states of all required objects for each Application Program (14) execution, which is preferred to perform the most useful form of debugging.

Debug Message Production

To analyze, debug and/or modify the operation of a system, a Tool Device (4) must be able to monitor the state of the various objects within Control Devices such as the Control Apparatus' (155, 156) in real time. Due to the number of properties needed in a short period of time, the interpreted request message approaches are far too slow. As shown in FIG. 14 the real time monitoring task is accomplished in this architecture without the addition of any specialized monitoring firmware, by merely utilizing an instance of the common Producer Object (157) already contained within each Control Apparatus (155) being monitored and an associated instance of the Consumer Object (158) within the Tool Device (4) software to receive each produced message. This invention utilizes the Producer Object (22) and Consumer Object (20) to provide a common network independent interface for interaction with the Application Programs (14) within a Control Apparatus for any supported network, even networks not based on the producer/consumer paradigm.

Figure 17:
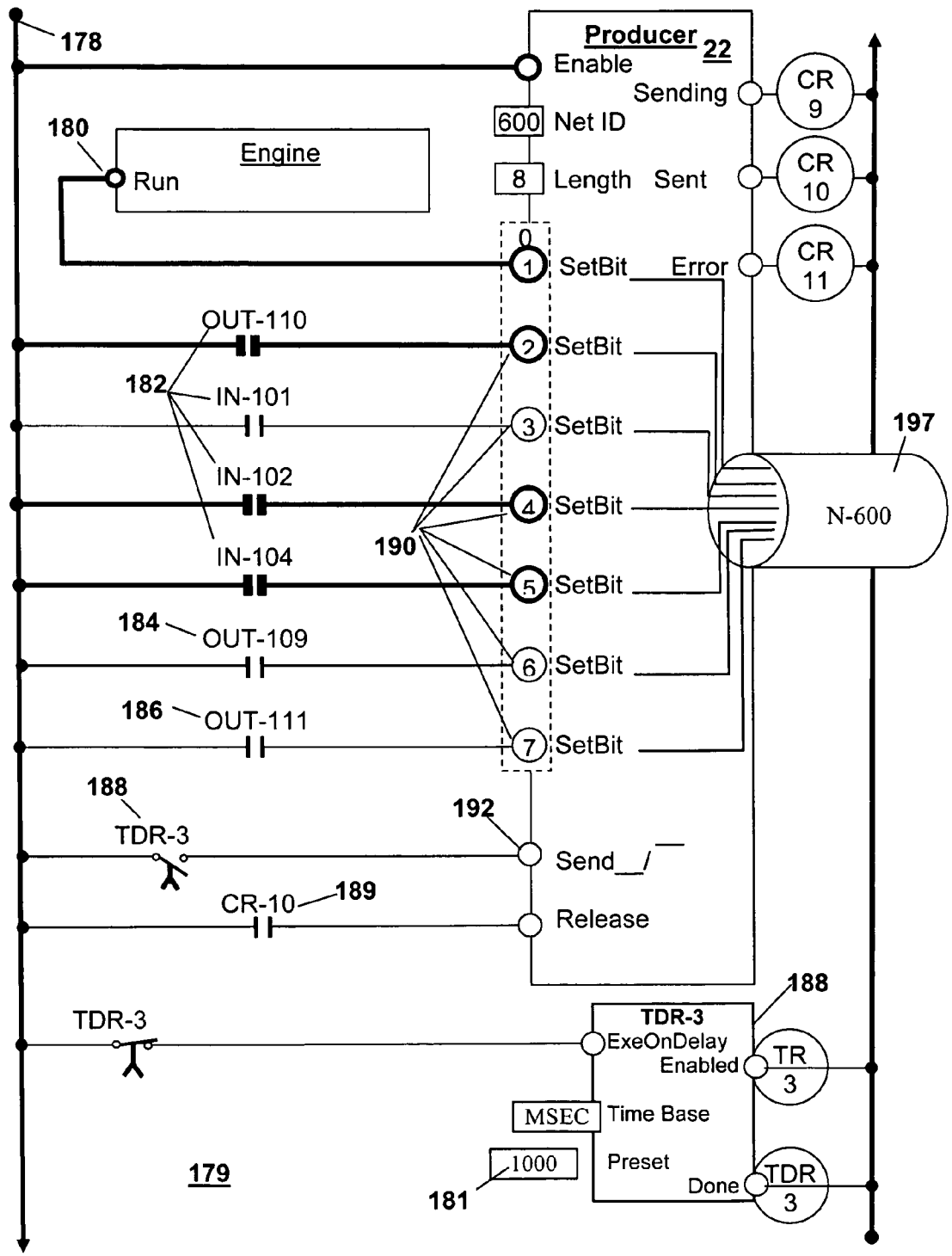
FIG. 17 is an animated graphical view and representation of the application of a producer object used by an application program to manage the transmission of control messages on a network as it might appear on a display screen of a graphical tool device in accordance with this invention

For example, to monitor the state of internal Control Apparatus variables during execution the Application Program (175) shown in FIG. 16, in the present invention the Tool Device (4) downloads the Debug Monitoring Application Program (179) shown in FIG. 17 to the Driver Seat (155) Control Apparatus. The appropriate instructions can be added to an existing Application Program (14) within Driver Seat (155) Control Apparatus or it may download it to a separate Debug Application Program (179) within the Driver Seat (155) Control Apparatus when the target Control Apparatus supports multiple instances of the Engine Object (16). To place the desired data into the Message property of a Producer Object (22) the supported Producer Object (22) real time Function Identifiers, like the Set Bit (190), Set Byte, Set Word16 and so forth are utilized. These external Function Identifiers allow the user to place any property of any object class within a Control Apparatus into any location of any available message within the Control Apparatus. Each normally open contact (182,184,186) closes when the respective relay coil is true applying a true to the specific bit within message byte zero. The state of the Run (180) property of the Engine Object (16) is placed in bit one of byte zero. As shown in FIG. 17 the monitoring message N-600 (197) shall be produced each time timed closing contact TDR-3 (188) closes, resulting in a true being applied to the Send (192) function. The rate at which this message is sent shall be determined by the timer Preset (181) property of the Time Delay Relay TDR-3 (188), which in this case is one thousand milliseconds. If the timer Preset (181) property of TDR-3 (188) is shorter then the execution interval of the Debug Application Program (179) the debug message shall be sent each time the Debug Application Program (179) executes.

Since this invention, places this debugging functionality in instances of the Application Programs (14) it allows a Control Apparatus (155) to support a significant range of functionality since only the diagnostic functionality required at any point in time is maintained and executed within the Control Apparatus' (155) limited memory. The present Control Apparatus architecture invention requires no diagnostic monitoring abilities within a Control Apparatus until they are placed in an Application Program (14), at which time any desired behavior can be downloaded using the common device independent external Configuration Bus (10) interface and related communications object functions.

Debug Message Consumption

Figure 18:
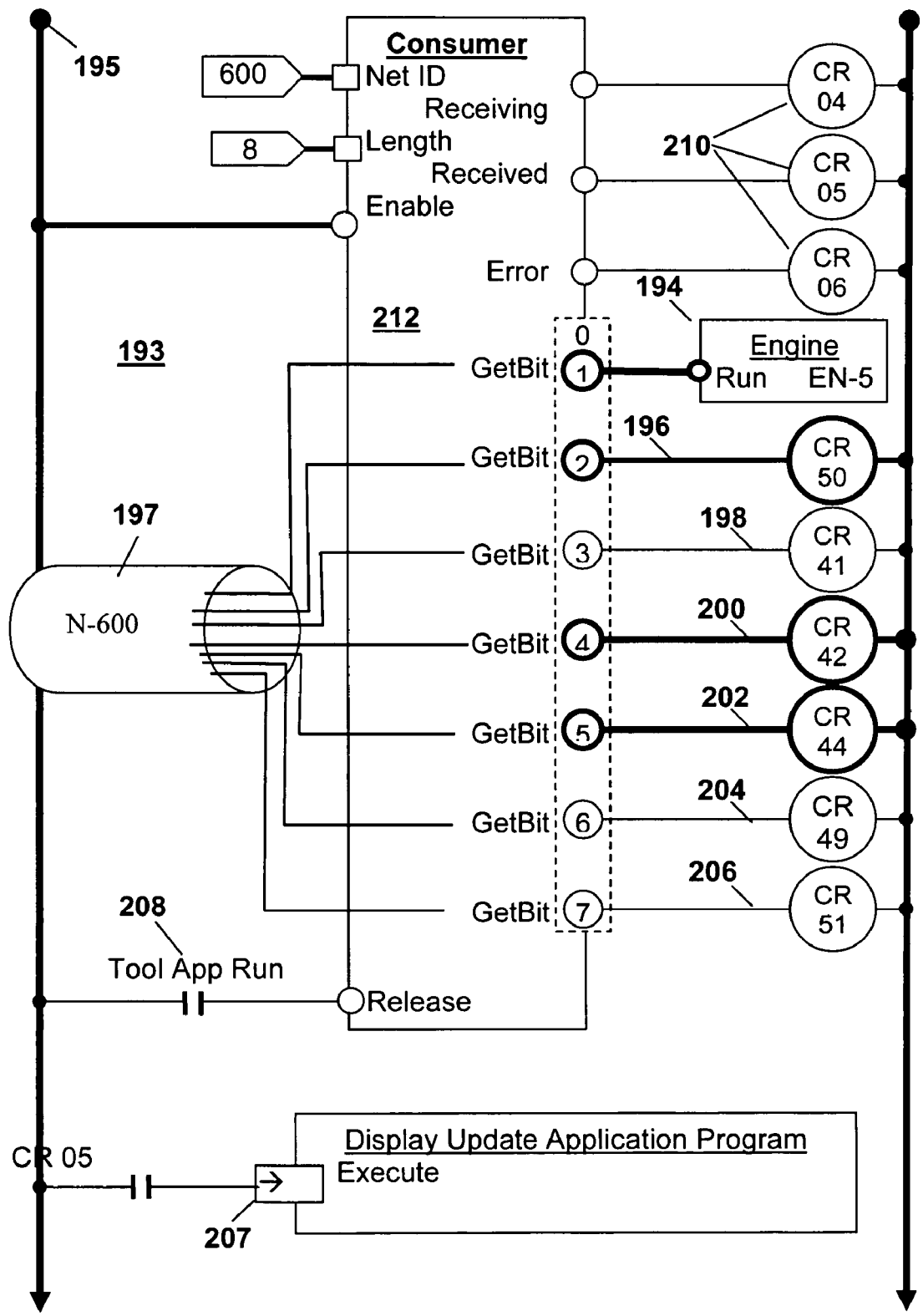
FIG. 18 is an animated graphical view and representation of the application of a consumer object used by the application program to manage the reception of control messages from a network as it might appear on a display screen of a graphical tool device in accordance with this invention

As shown in FIG. 18 within the Tool Device (4) a Debug Tool Application Program (193) (corresponding to the Debug Message of FIG. 17) can be was created by the Tool Device monitoring software for receiving the message data packet (197) labeled N-600 which is produced by the Control Apparatus (155) by the Debug Application Program (179) shown in FIG. 17 contained within the Control Apparatus (155). When the message N-600 (197) is received by the Consumer Object (212) contained within the Debug Tool Application Program (193) within the Tool Device the Received coil CR-05 shall go true and the message received (197) shall be available at the message terminals of the Consumer Object (212). The Debug Tool Application Program (193) performs a series of GetBit functions and updates the appropriate instances of Relay Object assigned to the Tool Display Application Program (196, 198, 200, 202, 204, and 206) whose instances are referenced in Table 10. The Debug Tool Application Program (193) is executed over the Tool Devices' Tool Control Bus (36). As described earlier, in FIG. 18 the instances of each object class consuming these monitoring values are the internal Tool Device instances (196, 198, 200, 202, 204, and 206) assigned within the Tool Device (4) and are different instance values then those inside the Control Apparatus (155), since the Tool Device may be monitoring instances from multiple Control Apparatus (155 and 156) at the same time (not shown). As shown in FIG. 18 each time a message (197) is consumed, CR-05 goes true, closing the normally open contact that then applies a true to the Execute (207) function for the Display Update Application Program. When the Execute (207) is true the Display Update Application Program shown in Table 10 executes over the Tool Bus (38), which would update the graphical icons shown in FIG. 16 based upon the values received in message N-600 (197). The Debug Tool Application Program (193) shown in FIG. 18 and the Display Update Tool Application Program (175) described earlier and shown textually in Table 10 could have been contained within a single Application Program within the Tool Device (4) but are separated since multiple applications within the Tool Device may be altering the same Debug Tool Application Program (193) as well as the fact that the message arrival rate may be much faster then the display screen update rate. The Debug Tool Application Program (193) updates the RELAY_CoilValue (163) property of the respective Relay Object (46) instance within the Tool Device (4) across the Tools Control Bus (36) where the Display Update Tool Application Program (175) described earlier in Table 10 updates the icons on the screen, executed across the Tool Bus. A simple execution of the associated Tool Application Programs (193 and 175) upon receipt of the desired message(s) is far more efficient, both in memory and CPU execution time than traditional object property polling techniques described earlier.

The architecture enables the conversion of the internal variable monitoring functionality into an Application Program (179) within the Control Apparatus (155), the conversion of the Control Apparatus Application Program (175) into a Tool Display Application Program shown in Table 10 within the Tool Device (4), and the conversion of the debug message monitoring functionality into the Debug Tool Application Program (193) within the Tool Device (4). Once a Display Application Program conversion is performed within the Tool Device (4), it is easily scrolled when the portion of the Display Application Program (175) is scrolled by the user where the tool accomplishes this functionality without any fixed firmware or software within either the Control Apparatus (155) or Tool Device (4) other then the ability to execute the Application Programs (193 and 175) intended for this purpose and the Tool Device's ability to dynamically create the related production and consumption application programs and download them dynamically to the Control Apparatus as the screen is scrolled.

As a superset of the Control Apparatus architecture the Tool Application Program (44) invention within the Tool Device (4) converted the common external Application Program format conveyed over the Configuration Bus (10) from the Control Apparatus (155) to a desired internal Display Update Tool Application. Program (175) format textually shown in Table 10 and graphically shown in FIG. 16. Like the external Application Program conversions performed within a Control Apparatus, Tool Device (4) software may substitute the monitored Control Apparatus external Class Identifier and external Function Identifier into an internal number, optionally the function call addresses for the Tool Bus (38) display function equivalent of the Control Bus (12) functions within the Proxy Application Program (44). In the preferred implementation, when the Tool Bus (38) function address is substituted for the Control Apparatus independent external Class Identifier and external Function Identifier, the external Function Value the associated Instance Identifier from the target Control Apparatus (155, 156) contained in the RELAY_CA_Instance (161) property in FIG. 15 is mirrored with a unique internal Instance Identifier within the Tool Device (4) software which is unique to the System and is the same instance referenced within the Display Update Tool Application Program (44). This technique allows the Tool Device (4) to simulate a Control Apparatus and enables convenient System Application Program (44) simulations and system monitoring in an efficient manner within the Tool Device (4) software which is implementation independent of the various Control Apparatus (155, 156) being monitored.

When the Tool Bus (38) functions execute to update the associated icons on the screen, the property values for the various Control Apparatus (155) being monitored will contain the latest snapshot of values retrieved from the Control Apparatus (155) by the Debug Tool Application Program (193) shown in FIG. 18 within the Tool Device (4). When the user scrolls to different Tool Application Programs (44) or a different portion of a displayed Tool Application Program (44), information no longer visible on the display screen may be dynamically removed from the Debug Tool Application Program (193) for the Consumer Object (212) shown in FIG. 18 which executes over the Tool Control Bus (36) within the Tool Device (4) and those connected to the Produced Object (190) of the Debug Application Program (179) shown in FIG. 17 within the Control Apparatus (155) being monitored.

For example, should the Tool Device (4) wish to stop the monitoring Debug Application Program (14) within the Control Apparatus (155) while it is updating various Application Programs, for the Debug Application Program (179) shown FIG. 17 it merely need set the Branch object, instance fifteen (178) to FALSE. When FALSE all monitored contacts (182, 184, 186), the producer control contacts (188, 189) and the Timed Delay Relay TDR-3 (188) shall all go FALSE guaranteeing the Send (192) shall not go TRUE. The branch instance (178) would not be set to TRUE until the Debug Tool Application Program (193) within the Tool Device (4) completes its modifications. In addition to setting the Function Values from the objects no longer monitored to the new objects in FIG. 17 in the Control Apparatus (155) being monitored, the Tool Device (4) software would also modify the Relay Object instance values in the respective Debug Tool Application Program (197) shown in FIG. 18 within the Tool Device (4) to the respective system instances. The Tool Device would then set the Branch instance for the left rung (178) to true to re-enable the Debug Application Program (179) in the Control Apparatus (155). In the preferred implementation, where sufficient message and memory space exists, a software Tool Device (4) may begin monitoring object property values prior to the user scrolling the display screen thus significantly improving performance.

Although the Debug Application Program (14) shown in FIG. 17 and the Debug Tool Application Program (44) shown in FIG. 18 may be dynamically created by the Tool Device (4) software and generally not displayed to the user during debugging, the same paradigm, same objects and same techniques may be utilized in the Application Programs (14) by the user to create any desired network behaviors required in any application on any network.

Tool Bus & Tool Configuration Bus

Unlike traditional software programming techniques used to acquire property values from devices over a network, the Tool Bus (38) inherits the operational model used for the Control Bus (12) of the Control Apparatus where the Application Programs (14) being monitored over the Tool Bus (38) do not directly create, or have knowledge of, the network protocols between the Tool Device (4) and the target Control Apparatus. The Tool Bus (38) merely interacts with internal proxies of the object classes resident in the Tool Device that reflect the classes in application programs contained within multiple Control Apparatus within the System. The Tool Configuration Bus (36) functions within object classes within a Tool Device (4) would include interpreted Requestor Message functions in addition to the Responder Message functions as contained within a Control Apparatus. A Requestor Message function creates a Request Message and sends it over a network to a Control Apparatus, where the Control Apparatus servicing the Request Message contains the Responder Message function. The Responder Message function reads the Request Message, creates the appropriate Response Message and sends the Response Message over the network usually back to the Requestor Message function. The creation of the Request Messages and servicing of the Response Messages is one reason why the Tool Configuration Bus (34) is differentiated from the Configuration Bus (10) within the Control Apparatus. Obviously a Tool Device (4) may also function as a Control Apparatus and thus contains the Responder capabilities in its object classes.

The execution of the Display Updating Tool Application Program (44) shown in Table 10, whose inter-object dialogs occur over the Tool Bus (38), contains parameters beyond the typical Class_ID, Function_ID, Instance_ID and Function Value retrieved from the Control Apparatus, including a Timeliness value. The timeliness value is used by the Tool Bus (38) functions within the Tool Device (4) to determine if the duration of time since the value of the requested proxy properties within the Tool Device was updated from the Control Apparatus. The addition these types of variables within the inter object dialogs within the Tool Device (4), that are not needed within a Control Apparatus, is another reason why a Tool Bus (38) was added to the Tool Device in addition to the Tool Control Bus (36). From an inter object dialog perspective, the Tool Control Bus (36) is equivalent to the Control Bus (12) within a Control Apparatus with a few minor exceptions, primarily the usage of System Instance Identifiers over the Tool Control Bus (36) which are proxies of instances within one or more Control Apparatus.

For example, if the execution of the Display Updating Tool Application Program (44) sets the timeliness value to a large value this would indicate an "off line" execution mode to the proxy instances where the Control Apparatus is not accessed over the network and the Tool Device (4) may optionally simulate the execution of the Application Programs (14) by executing the Proxy Application Programs (44) over the Tool Control Bus (36) without regard to the property values contained within the actual Control Apparatus. This mode is often used when a network connection to the Control Apparatus is not available and the user wishes to review program operation and optionally modify the Application Programs (14) before committing them to the Control Apparatus'. In fact, the functions executed within the Tool Device (4) during off line simulations may exactly replicate the functions and code used within some Control Apparatus. If the timeliness value passed over the Tool Bus (38) is one second and the values within the Tool Device (4) are newer then one second, the local property value within the proxy object is used by the Tool Bus (38) function. If the timeliness value is one second and the proxy value within the Tool Device (4) is older then one second, the Tool Device (4) may send the interpreted Request Message (48) described previously to acquire an updated value. However, if the specified timeliness value is ten milliseconds the more efficient and less time consuming method must be utilized to acquire property values assuming the interconnecting network can achieve the requested timing requirements.

The Tool Control Bus (36) is equivalent to the Control Bus (12) except for the usage of System Instance Identifiers used to interact with the proxy instances contained with the Tool Device (4). The Tool Control Bus (36) is also the bus utilized by the Tool Debug Application Program which performs the real time updating of properties of object classes previously discussed in FIG. 17 and FIG. 18, and as such generally has a higher CPU priority within a Tool Device (4) then the Tool Bus (36).

Tool Object Classes

This invention places the management of all instances of each object class within the System within the respective object classes within Tool Devices (4). The System Architecture defines how a Control Apparatus may contain properties that indicate the object classes and the number of instances of each object class the Control Apparatus supports or defines how a Tool Device (4) may recursively determine the object classes and number of instances of an object class that are supported within a Control Apparatus, after which time the Tool Device (4) may archive that information over the Tool Bus (38) or System Bus (40) for future reference. The gathering of this information is supported by a function within each object class, for support of the respective object class.

In the profiling example the gathering of object capabilities within a specific Control Apparatus may first use the Configuration Bus to determine properties exist within the Control Apparatus that contain the desired information. If the Control Apparatus does not contain this information, then a request may be generated over the Tool Bus or System Bus to determine if that information is already known. If neither of the buses contains the desired information, the respective function would perform the necessary recursion techniques, that are know to the requestor function within the tool's respective object class. This recursion technique would then populate the desired properties for the object class within the Tool Device and optionally over the System Bus.

System Bus

Where more then one Tool Device (4) may reside within a System and where additional information is required about an object class which is beyond the scope of information currently residing within a specific Tool Device (4), this invention provides for a System Bus (40). Sharing of additional object properties for the various object classes occurs over the System Bus (40), where the System Bus (40) supports a superset of the interpreted protocol used to communicate with a Control Apparatus over the Configuration Bus (34), where properties about a Control Apparatus that are not contained within the Control Apparatus may be retrieved in a manner similar to the Tool Control Bus (36) over the local Tool Bus (38) or externally via the interpreted System Bus (40) when one exists.

As shown in FIG. 15 when Proxy Application Programs are viewed across multiple Control Apparatus, the Tool Bus (38) functions provide support for additional System object properties, like a simulation time for each real time control function of each object class for each Control Apparatus in a System. Within the Tool Device (4) are additional or extended object properties like the System Identifier (166) which are used to navigate Control Apparatus specific properties like the network protocol, subnet identifier, network address and so forth that are not necessarily contained within the Application Program (14). Although a property like the System Identifier (166) would be referred to as a "key field" in data base systems, where the present invention; provides a Control Bus (12) within the Control Apparatus that is a subset of the Tool Control Bus (36) within the Tool Device (4), provides for the navigation of Control Apparatus specific implementations of objects via a common external interface for creation and manipulation of Application Programs (14) within all Control Apparatus, provides for the interaction of objects between Control Apparatus via a Tool Configuration Bus (34) within a Tool Device (4), provides transparent access to additional object properties between Tool Devices (4) and System Databases (2) via a common System Bus (40), and accomplishes this integration by defining a common Control Apparatus Architecture, a common Tool Device Architecture, and interacts with general purpose computers and data bases via a common System Bus (40) via database independent common object interface protocol and related internal tool functions and external network services.

Whereas the Tool Bus (38) functions provide interfaces to the user via an available display, keyboard and mouse, the Tool Device (4) may optionally interact with a local and/or remote database via the System Bus (40). The System Bus (40) functions provide features to support object properties for a Control Apparatus not contained within the Control Apparatus; to facilitate support of the System versus support of an individual Control Apparatus, to support of a set of Control Apparatus within a specific Tool Device (4), and so forth.

For example, functions which identify the "software revisions" of the various object classes within the each Control Apparatus made by various vendors within a System would be acquired over the System Bus (40). This System Architecture allows registration of revisions of each object function for each object class revision for each Control Apparatus accessible over the System Bus (40). Should a change be identified in a specific revision of a function or a specific object class for a specific Control Apparatus built by a specific vendor, the affected Function Identifiers of the affected object class is identified, where all the affected Control Apparatus installed on any equipment within any building known to the database can be quickly identified. In scenarios where the affected behavior of the revised object class is utilized by the Application Programs (14) of a specific Control Apparatus, either the Application Program (14) or Control Apparatus can be updated to eliminate operational problems where corrective action is immediately necessary. When immediate action is not required it can be scheduled for correction at a convenient time.

This invention provides robust preventative maintenance and system support functionality for multiple implementations of the same objects across all Control Apparatus from all vendors; due to the common external interfaces to real time object functions, and due to the ability to identify these common real time functions within a Control Apparatus, and due to the ability to identify when these common real time functions are referenced within the common Application Program (14) formats, and due to the existence of a System Bus (40) through which all Tool Devices (4) can reference Control Apparatus object support information in a common way using the common System Bus (40) interface.

In effect this invention provides a "bill of materials" of the components used within a Control Apparatus, both hardware and software that would be useful for the maintenance and support of a Control Apparatus or a System composed of multiple Control Apparatus.

For example, assume "Vendor A" finds a defect in the NC_Execute (35) function of the Relay Object (24) class shown in FIG. 7 and determines this function is contained within eight of the ten different Control Apparatus products they have shipped. Vendor A would follow the registration prescribed processes and procedures that are beyond the scope of this invention, upon completion of which an update would occur over the System Bus (40). Upon receipt of the update the Corporate Computers (2, 8) would execute System update support functions contained within the System Bus (40) interface. The System update functions would scan the common Application Programs (14) archived in the System database for each Control Apparatus known to the System database to determine if the affected Class Identifier and Function Identifier for the revised function are used within any of the affected Control Apparatus. If a match is identified, the affected instructions of the affect Application Programs (14) for the specific devices affected would be minimally referenced within a revision update report. This report may then be used to determine the desired corrective action, where automatic updates are one possible selection.

Application Program Component Libraries

The System Bus (40) functions also provide access to a library of common reusable Application Programs (14) and Application Program Components, in addition to "where used" references of Application Programs (14) and Application Program Components for possible correction should Application Program (14) anomalies be identified within a Control Apparatus. Various Application Program Components may be downloaded to each Control Apparatus, some of which shall be used to dynamically profile the performance of multiple aspects of the object execution within a specific Control Apparatus. This invention utilizes a common Control Apparatus Architecture, Tool Device Architecture and System Architecture to enable reusable operational profiling functions for Control Apparatus and Control Systems. As Control Apparatus and Control System Profiling information is captured, it is then placed in any System database usually accessed via the common external System Bus (40) for each Control Apparatus used, and may be accessed by other Tool Devices (4) for purposes of simulating and emulating system functions. Additionally, the System Bus (40) generally contains various object metrics, like the execution time of each Control Bus (12) function within a Control Apparatus. This information is useful during system simulations and system emulations when determining if the performance using a specific Control Apparatus is sufficient to achieve the application requirements of a new application. This invention creates this common System Architecture as a means of optimally extending, diagnosing, reusing and maintaining Control Apparatus and Application Programs (14) across applications, equipment, buildings, companies and businesses.

For example, assume a product supplier specifies that their sensor has a Mean Time Between Failure (MTBF) of one hundred thousand cycles. If it is desirable to determine when the device has exceeded this value and may fail a common Application Program Component (21) shown in FIG. 19 may be used. The Application Component (21) is an example of a portable component that may be added to an architecture compliant Control Device. The base Application Program Component (212) to be described requires four objects; Counter Object (213), Comparator Object (214, Relay Object (215) and Engine Object (216). If it is desirable to produce the count status at a timed interval and space does not exist within an existing message, a Producer Object (218) and Timed Delay Relay Object (219) must also be added.

Figure 19:
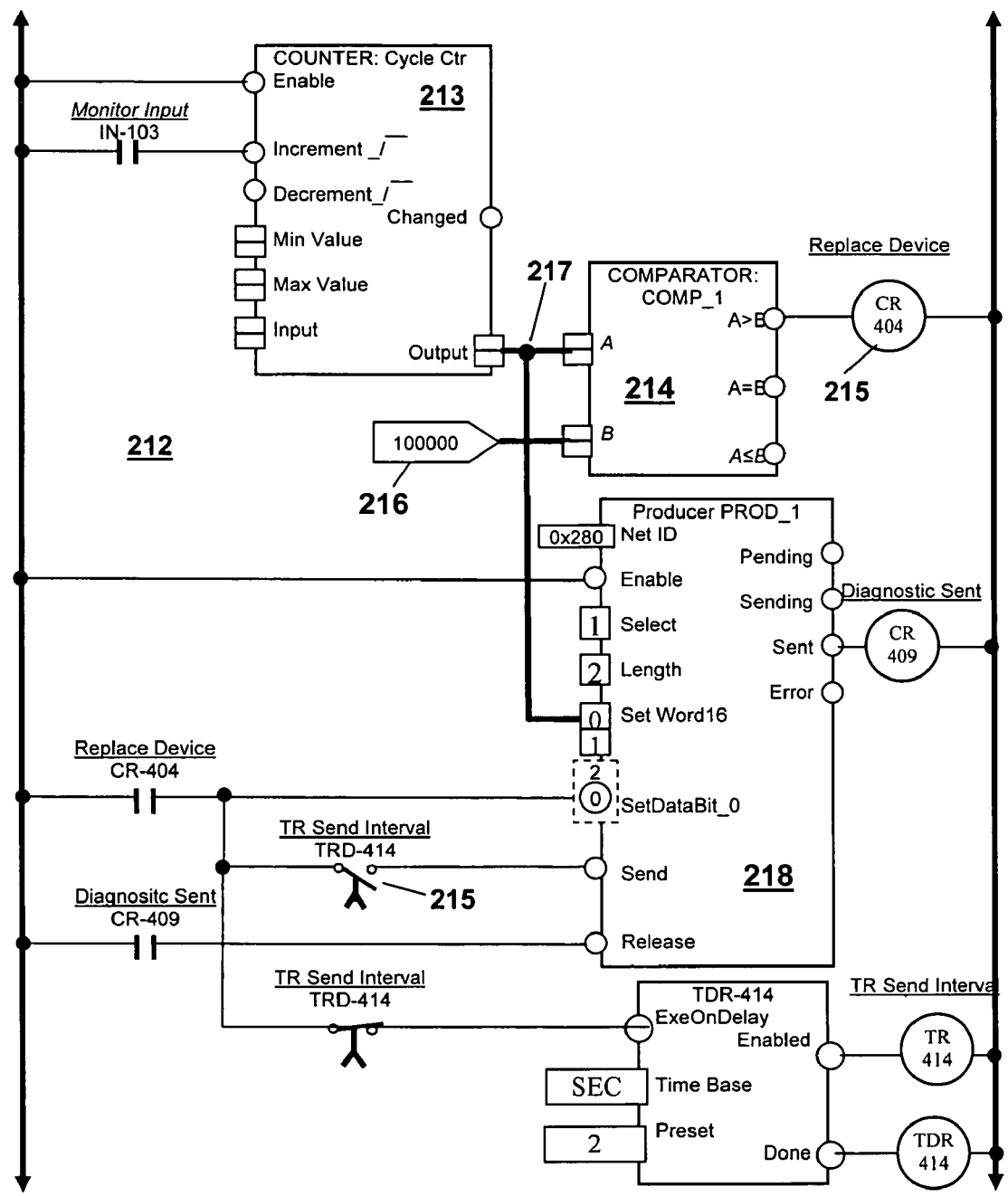
FIG. 19 is a schematic view and of an example of a portable application program library component that may be placed in the application program of any device requiring the cycle count diagnostic ability as it might appear on a display screen of a graphical tool device in accordance with this invention.

Although the compliant Tool Device (4) would display the Application Program (14) object icons and interconnects similar to that shown in FIG. 19, the corporate computer database would contain the following external Application Program (14) number sequence of Class Identifier, Function Identifier and Function Value shown in the three left Computer Memory columns of Table 11, except the Function Values referencing an instance would be wild card values as stored in the Application Program Component Library.

The twenty eight instruction product independent script shown in Table 11 may be imported by any architecture compliant Tool Device (4), added to the Tool Application Program (44) within the Tool Device (4), and transferred into the target Control Apparatus using a Control Apparatus independent external configuration dialog.

TABLE 11

| Computer Memory | | | Human Readable Definition | | |
|---|---|---|---|---|---|
| 0 | 1 | 0 | CID_BRANCH | FID_GET | BR_0 |
| 6 | 0 | 1 | CID_COUNTER | FID_ENABLE | CycleCtr |
| 0 | 1 | 0 | CID_BRANCH | FID_GET | BR_0 |
| 1 | 0 | 4 | CID_RELAY | FID_NO_EXECUTE | IN-103 |
| 6 | 4 | 1 | CID_COUNTER | FID_INCREMENT | CycleCtr |
| 6 | 6 | 1 | CID_COUNTER | FID_GET_OUTPUT | CycleCtr |
| 0 | 1 | 1 | CID_BRANCH | FID_DATA_SET | DB_1 |
| 5 | 3 | 1 | CID_COMPARATOR | FID_SET_INPUTA | COMP_1 |
| 0 | 1 | 1 | CID_BRANCH | FID_DATA_GET | DB_1 |
| 9 | 10 | 1 | CID_PRODUCER | FID_SELECT_INSTANCE | PROD_1 |
| 9 | 13 | 0 | CID_PRODUCER | FID_SET_MSG_WORD16 | 0 |
| 4 | 5 | 100000 | CID_PARAMETER | FID_SET_EXCHANGE | 100000 |
| 5 | 4 | 1 | CID_COMPARATOR | FID_SET_INPUTB | COMP_1 |
| 5 | 0 | 1 | CID_COMPARATOR | FID_GET_AOVERB | COMP_1 |
| 1 | 0 | 4 | CID_RELAY | FID_SET_COIL | CR_404 |
| 0 | 1 | 0 | CID_BRANCH | FID_GET | BR_0 |
| 1 | 1 | 4 | CID_RELAY | FID_NO_EXECUTE | CR_404 |
| 0 | 0 | 1 | CID_BRANCH | FID_SET | BR_1 |
| 9 | 5 | 1 | CID_PRODUCER | FID_SET_MSG_BIT0 | PROD_1 |
| 0 | 1 | 1 | CID_BRANCH | FID_GET | BR_1 |
| 2 | 8 | 5 | CID_TIMED_RELAY | FID_ONDELAY_NO_EXECUTE | TRD_414 |
| 9 | 1 | 1 | CID_PRODUCER | FID_SEND | PROD_1 |
| 0 | 1 | 1 | CID_BRANCH | FID_GET | BR_1 |
| 2 | 9 | 5 | CID_TIMED_RELAY | FID_ONDELAY_NC_EXECUTE | TRD_414 |
| 2 | 7 | 5 | CID_TIMED_RELAY | FID_ONDELAY_EXECUTE | TRD_414 |
| 0 | 1 | 0 | CID_BRANCH | FID_GET | BR_0 |
| 1 | 1 | 4 | CID_RELAY | FID_NO_EXECUTE | CR_404 |
| 9 | 15 | 1 | CID_PRODUCER | FID_RELEASE | PROD_1 |

The Cycle Count Application Program Component (212) shown in FIG. 19 monitors the desired input, in this case "Monitored Input" and increments an instance of the Counter Object (213) called "Cycle Count" on each rising edge. The Cycle Counter Output is read and its value is used to set the value of a Data Branch (217), which then sets the value of input "A" of the Comparator Object. (214) Input "B" of the Comparator Object is set to a value of one hundred sand (216) which is the comparator trip threshold value. When input "A" exceeds input "B" the "A>B" Comparator Output goes TRUE which then activates the "Replace Device" relay coil (215). The Data Branch (217) value is placed in the produced message at Producer Object (218) as well as the Replace Device status, where this message is produced whenever the Timed Delay Relay Object expires and the Replace Device contact is closed.

Should it be desirable to place this diagnostic functionality in numerous other Control Apparatus within the system, this same script may be read by any architecture compliant Tool Device (4), combined with the execution timing profile of any available Control Apparatus, and the results reviewed to determine which Control Apparatus meet the requirements for their current target application when executing the combined Application Programs (14). If defined requirements are not achieved the MTBF Application Program Component shall not be used in those Control Apparatus unless further modifications are made to achieve their required performance with the addition of the new functionality. Due to the common external interfaces this architecture provides a Control Apparatus independent approach to; determine if the target Control Apparatus contains the object classes needed to execute the new Application Program Component (212), if it contains sufficient Application Program (14) space, and determination if a performance problem may exist prior to downloading the Application Program Component (212). This can be accomplished while all utilizing the same Tool Device (4) across all Control Apparatus.

Edit while Running

Figure 20:
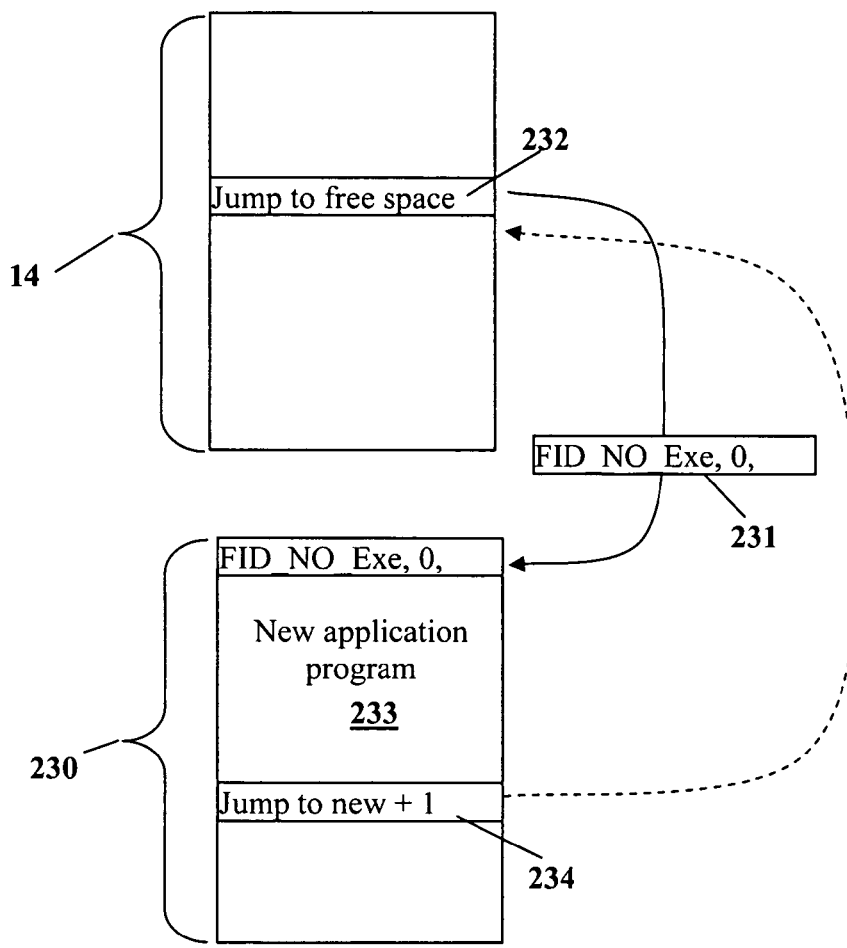
FIG. 20 is a diagrammatic view of an example of how run time editing may be accomplished on an application program when utilizing the architecture defined with this invention.

Unlike programming languages like Java, this invention allows the alteration of an Application Program (14) while the Application Program (14) is executing. This is accomplished, as is the configuration of any other objects, over the Configuration Bus (10) utilizing the common Application Program (14) configuration interface. In the preferred implementation, the contents of an instance of the Application Program (14) are actually altered in real time between executions of the Application Program (14). Although various common in the art techniques are possible, the preferred implementation minimally utilizes the equivalent of a Jump or Call function within the Application Program (14) property of the Engine Object (16). The technique utilized by a Tool Device (4) to modify a running Application Program (14) varies depending upon the desired affect. For example, as is common in the art, if portions of an active Application Program (14) are to be removed during operation, the first instruction to be removed is replaced with an Engine Object (16) Jump Function, where the GLOBAL_App Function Value of the Control Bus (12) Jump Function contains the Element (offset) in the Application Program (14) to which to jump. If portions of the active Application Program (14) are to be inserted, one efficient approach shown in FIG. 20 places the Application Program (14) instructions to be added in a free area (230) of Application Program memory. The first instruction (231) placed in the free space area is a copy of the existing instruction that resides at the location (232) where the new Application Program instructions (233) are to be inserted and the instruction that will eventually be replaced with a Jump Function. A Jump Function (234) is added at the end of the instructions added in free space specifying a jump back to a desired return location in the Application Program (14), generally the element following the insertion location. Once the instructions for the change expressed in architecture compliant application code are downloaded over the Configuration Bus (10) and placed in the free space area (233) the existing instruction (232) in the Application Program (14) is replaced with a Jump Function that jumps to the beginning of the instructions added in free memory (230). Although multiple instructions may be added to free space (233) in one Request Message (48) over the Configuration Bus (10), low performance Control Apparatus would generally service one Request Message (48), adding only one more instruction to free space (233) after each time the Interpreted Execute (50) function in FIG. 10 runs. As is common in the art this invention also allows a running Application Program (14) to be stopped, at which time the Application Program (14) is modified and then restarted. The mechanisms used by this invention are common in the art, where this invention claims the use of the common external Application Program interface across any Control Apparatus as well as the use of common Application Program Components made possible due to the common Application Program interface.

Local Object Testing

Figure 21:
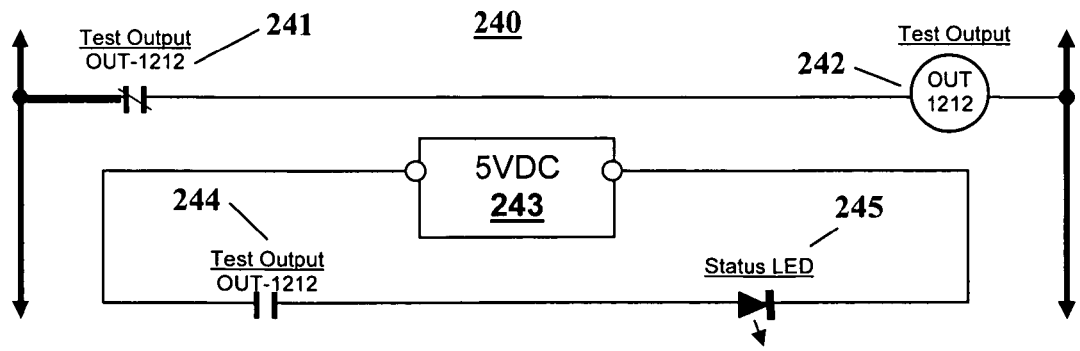
FIG. 21 is a schematic view and of an example of a portable application program library component that may be placed in the application program of any device requiring a timing test diagnostic ability as it might appear on a display screen of a graphical tool device in accordance with this invention.

Architecture compliant Application Program Components such as the program 240 shown in FIG. 21 for tracking scan interval timing simply using a contact 241, coil 242 and status LED 245 may also be downloaded to perform object testing within a target Control Apparatus, especially where an available network may also be used to monitor and optionally archive the testing and associated test results. The combination of Control Apparatus Architecture, Tool Device Architecture and System Architecture but primarily the common external Application Program (14) interface, the ability to create any desired network interface behavior and the ability to place any internal Control Apparatus information in any message enables the creation of these common hardware independent, portable object test Application Program Components.

Hardware Device Components

Figure 22:
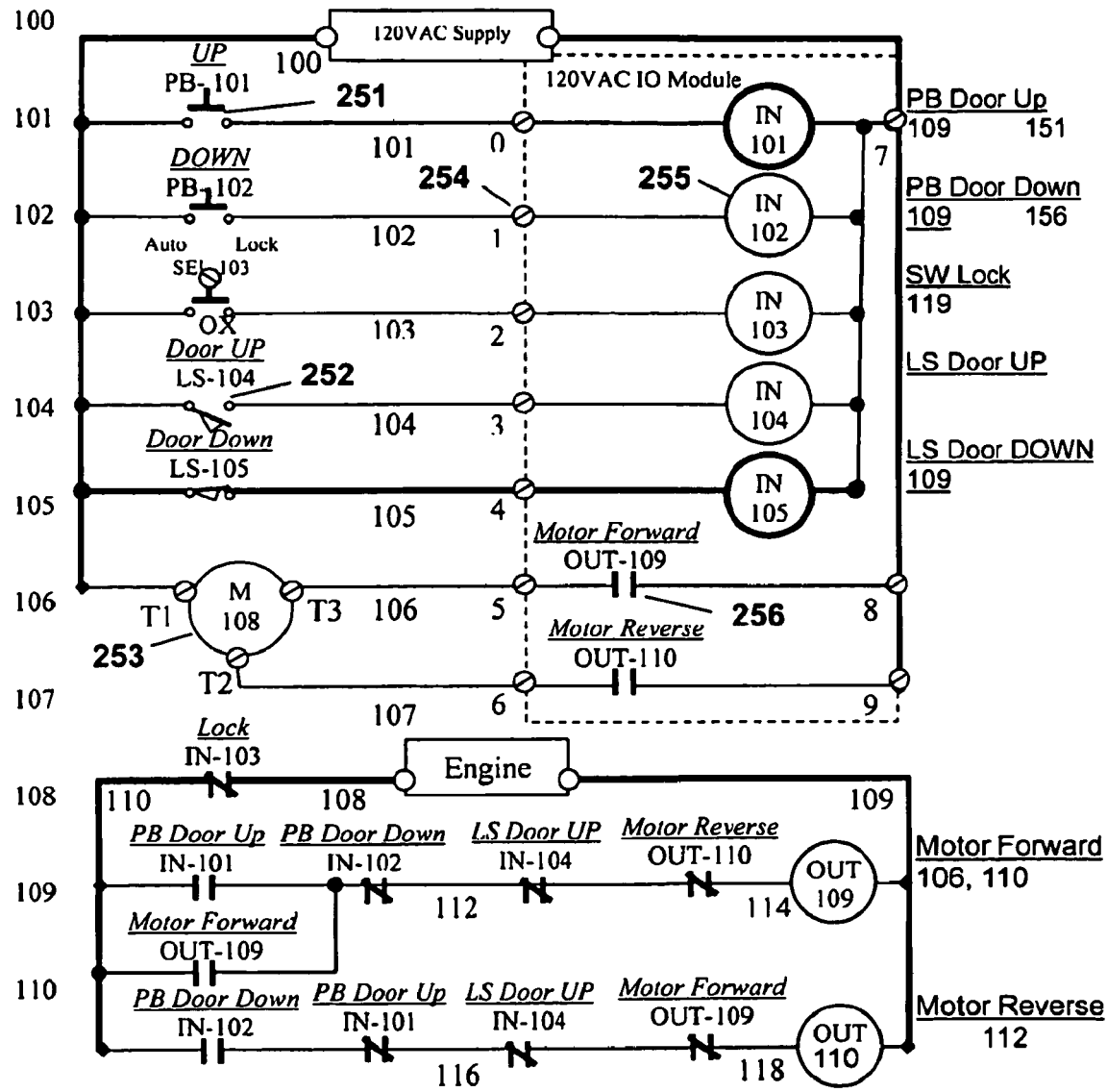
FIG. 22 is a schematic view and of an example of a merge of a hardware application program, a device driver application program and an executable application program as it might appear on a display screen of a graphical tool device in accordance with this invention.

This System Architecture invention defines a set of visible real time Function Identifiers for the hardware inputs and hardware outputs associated with Control Devices that may be optionally contained within a Control Apparatus for the purpose of exposing hardware devices and hardware interfaces to the end user via the Tool Device (4) utilizing the same internal Control Apparatus Object architecture used to expose executable Application Programs (14) except for the purpose of exposing the hardware devices and hardware interfaces to the end user via the Tool Device (4), to be collectively referred to as Hardware Objects. The Hardware Object Function Identifiers within the Tool Device (4) follow the exact same external interface rules for the Application Programs (14) contained within Control Apparatus, may be optionally contained within a Control Apparatus but generally retrieved via the Tool Bus (38) and/or System Bus (40) by the Tool Device (4). When supported within the Tool Device (4), the Tool Device (4) contains internal functions to provide functionality similar to the schematic display functionality for Tool Application Programs (44), like the display of hardware icons shown in FIG. 22 for the pushbutton (251), limit switch (252), motor (253), screw terminal (254), input hardware (255), output hardware (256) and supporting hardware related properties like connector type, connector label and so forth in conjunction with the display of application program icons. The Hardware Classes, Hardware Function Identifiers and Function Values provide this physical Control Apparatus display functionality with the same internal Tool Device (4) execution architecture, where the related display functions are executed within the same Display Updating Tool Application Program or other Tool Application Programs over the Tool Control Bus (36). The Tool Devices (4) provide this integrated "as wired" view without other graphical design tool CAD software is used to convey this information in inconsistent formats this System Architecture invention utilizes the same architecture utilized in Control Apparatus for programming and debugging support hardware. This architecture thus allows emulation of hardware interfaces to be graphically conveyed to the user providing additional levels of intuitive diagnostics due to the indication of the hardware states via the visual state of the hardware icons. Although many traditional software tools may use icons on the display screens this invention assigns common Function Identifiers to these Hardware Objects where the Hardware Object Function Identifiers are included within or combined with a Tool Application Program and where the hardware icons are animated along with the other Proxy Application Program (44) functions often within the same Display Updating Tool Application Program (44) thereby displaying an integrated external hardware to internal Application Program (14) view by executing the Display Updating Tool Application Program (44) over a combination of the Tool Control Bus (36) and Tool Bus (38). As with all other objects within this System Architecture invention the Hardware Objects may be optionally contained within the Control Apparatus accessed via the Configuration Bus (10), contained within the Tool Device (4) or may be accessed via a common external interface utilizing the System Bus (40). When these Hardware Function Identifiers are used in conjunction with the Display Updating Tool Application Program (44) they provide an integrated hardware and Application Program (14) view.

External Wiring, Equipment Emulations

This architecture allows for the same Display Updating Tool Application Program (44) paradigm to also be used to capture, and optionally emulate the physical wiring to, and between, Control Apparatus. Hardware Objects may represent a sensor (8) and/or actuator (7) external hardware interfaces in addition to electrical hardware interfaces to facilitate simulations or emulations of Control Apparatus to machine and/or process equipment. This architecture enables the updating of the inputs and outputs or IO of a Control Apparatus in the Application Programs (14), generically referred to as Device Driver Objects. Accordingly this architecture inherently allows disconnecting the external hardware object interfaces from the Application Programs (14) by removing or disabling these related real time Device Driver Object Functions within the Control Apparatus and applying process values directly to the Application Programs (14) to analyze the operation of the actual Control Apparatus Application Programs (14). This process and/or machine emulation is accomplished by creating special Equipment Application Programs (14) that execute within the Control Apparatus and that emulate the operation of the machine/process and apply their values to the Application Program (14) within the actual system of interconnected Control Apparatus. These Application Program (14) debugging techniques discussed previously may then be used to analyze the operation of the Control System on the actual Control System Control Apparatus without risk of damaging connected equipment during integration testing. This architecture invention allows the creation of Equipment Application Programs (14) that allow emulation of the machines/processes being controlled, through the modification or disabling of input/output interfaces within the Control Apparatus. The Equipment Application Programs (14) are thereby directly integrated with the Application Programs (14) as to allow he emulation of machine/process operation on the actual Control System without cycling the actual machine/process equipment. The Control Apparatus inherently contains no firmware to perform this functionality except the ability to alter its internal Application Programs (14).

This same technique is used to simulate and emulate network interfaces as well as monitor the internal values of any internal object properties during testing by producing their values over the network. This architecture allows the collection of the actual sensor values and equipment timing by downloading Application Program Components (14) intended for this purpose to Control Apparatus where the collected equipment information may then be used to simulate or emulate the operation of the actual equipment during system debugging or may be applied to the Application Programs (14) within a Tool Device containing the Tool Application Programs (44). Since the captured equipment operational information may be combined within the Application Programs (14) from the Control Apparatus in addition to the Function execution timing acquired from the Control Apparatus discussed previously, relatively accurate System emulations may be performed without putting the controlled equipment at risk while allowing rapid recursion of various equipment scenarios. This System Architecture inherently allows the Equipment Application Programs (14) to be placed in architecture compliant Control Apparatus where the monitored values may then be used to actually stimulate and monitor the actual Control Apparatus hardware to even more accurately emulate that operation of the actual control system, referred to as equipment profiling. This same approach may be used to create Test Application Programs that then alter the inputs to Application Program Components, monitor the actions taken by the Application Program Component and enable the identification of detected errors.

Control Apparatus Selection Via Simulations

Since the Control Apparatus architecture allows portability of Application Programs (14) across any Control Apparatus that supports the required real time object functions, and the architecture allows characterizing the performance of any Control Apparatus by modification of the Application Programs (14), thus the System Architecture allows creation of Tool Device (4) software that may determine which of the available Control Apparatus can achieve the requirements of an application. Since Application Programs (14) may be moved across Control Apparatus, required system performance may be achieved by repartitioning different portions of the Application Programs (14) across different devices to achieve the desired performance, fault tolerance, and so forth.

Object Profiling and Timing

To determine actual performance, this invention provides a common method of monitoring object operation within a Control Apparatus via externally accessible hardware by downloading an Object Profiling Application Program Components (14) for the desired object classes to the Control Apparatus and monitoring the Control Apparatus with an input on the Tool Device (4). The Tool Device (4) shall recursively monitors various downloaded Object Profiling Application Program Components (14) that exercise various object transitions, where the Object Profiling Application Program Components are specifically designed to execute each object in all possible states, and acquire the execution time of those object functions for each combination of object state transitions for each real time object function. These Object Profiling Application Program Components (14) are available within the Tool Device (4) via the local Tool Bus (38) or available via a common external interface to an Application Program Component Library via the System Bus (40). For example, one of the most basic tests for a device would include an Application Program (240) similar to that shown in FIG. 21.

The graphics shown FIG. 21 are created by the Tool Device (4) by retrieving two different Application Programs (14) from the Control Apparatus. The 5VDC Power Supply Hardware Object (243) the Relay Normally Open Contact (244) function and the LED Execute (245) Function Identifiers were read from an Application Program (14) property of a Hardware Application Program instance of the Engine Object. (16), where the Control Apparatus contained this Application Program to indicate to the Tool Device that a Test Output (244) is supported by the Control Apparatus and it provides an optical interface via the Status LED (245). The present invention includes a Test Output Relay composed of an interface to the Output Driver Object Relay Coil (242), an actual hardware output contact (244) that provides power to the Status LED (245) whenever the Relay Coil (242) is on, thus closing the normally open contact (244) which in turn lights the Status LED (245). The Tool Device (4) may monitor the light from the LED to determine when the Status LED (245) is ON and when it is OFF. In the preferred implementation where an existing device platform has its firmware changed to support this architecture, an available embedded output like an existing LED is utilized to provide timing information to the Tool Device. Where an available network connector exists and where the network standard allows the definition of available pins for a specific usage, this architecture encompasses assigning this Test Output functionality to one of the available pins. This allows the Tool Device to conveniently monitor the state of the Test Output from Control Apparatus with the appropriate Tool Device interface hardware, and thus enable performance monitoring via an existing network cable.

When profiling a Control Apparatus, the current Application Program (14) within a Control Apparatus is generally cleared by the Tool Device (4). The Application Program (240) shown in FIG. 21 is then downloaded to the Application Program property of the Engine Object (16) class of the Control Apparatus under test, where in this implementation the contents of Table 12 would then reside internal to the Control Apparatus as the application program for the device.

The first time the portable Application Program Component shown in FIG. 21 executes the Test Output (243) shall be off. Since the Test Output (242) is off, the normally open contact (241) is closed, providing a true to the Test Output (242) immediately turning it on. When the Test Output (242) is on, the normally open contact (244) closes lighting the Status LED (245). The lighting of the Status LED (245) is detected by the tool device which would start an accurate timer. The next time the Application Program (240) executes the Test Output (242) is on in memory from the prior execution. Since the Test Output (242) is on, the normally closed contact (241) opens, which in turn provides a false to the Test Output (242) turning it off, which in turn opens the normally open contact (244) which in turn turns off the Status LED (245). The Tool Device (4) shall monitor the state of the Status LED (245) to determine the duration of time between the Test Output cycling ON then cycling OFF. The minimum and maximum cycle times detected will determine the baseline execution time for the Control Apparatus being monitored. This is known as a chattering relay test. In the cost optimized implementation of this architecture, this baseline performance metric has been achieved with the eight byte internal Application Program (14) shown in Table 12;

TABLE 12

| Internal Function Identifier | Internal Function Value (Instance) |
| --- | --- |
| FID_BRANCH_GET | 0 |
| FID_RELAY_NC_EXECUTE | TEST_OUTPUT |
| FID_RELAY_COIL_SET | TEST_OUTPUT |
| FID_ENGINE_END_OF_PROGRAM | 0 |

As portable Application Program Component entries are added to the Application Program (240) shown in Table 12 the execution time of the Control Apparatus will change. The user employs the Tool Device (4) to vary the Application Program Components within the Control Apparatus, while monitoring the Status LED (245) to determine the execution time of the individual object functions (instructions) added to the Application Program (240), thus creating a Device Performance Profile. The measured values are archived within the Tool Device (4) over the Tool Bus (38) or over the common external interface to the System Bus (40), where these measured values may be stored as properties of the respective object classes for this specific Control Apparatus. Where interrupt driven functionality may reside within a Control Apparatus the Tool Device (4) may perform operations on the Control Apparatus to capture the execution times of the various interrupt servicing functions when these durations could be critical to the performance of the equipment being controlled by the Control Apparatus. For example, performing various network request messages of various object classes at various rates would reveal a reasonable metric, or even a worst case metric, as a factor to be considered in programming critical control applications. The present architecture invention defines System Properties of each object class, like an "execution time" and "object revision", which may be used for storing metrics to be archived and accessed via a Tool Bus (38) or System Bus (40) for multiple maintenance and support scenarios.

When information is required over the System Bus (40), it may be acquired from archived information stored on Corporate Computers (2 and 6) using a protocol that is a superset of the Configuration Bus (34) protocols. The computers supporting the System Bus (40) generally provide an object interface wrapper to their unique data base interfaces. Placing the System Bus (40) protocol interface to the database provides a common access point for all Tool Devices (4) and does not require database translation interfaces in all Tool Devices (4). More specifically the general purpose computers would receive the same Get Property interpreted request messages from the System Bus (40) as the interpreted request messages are received by a Control Apparatus over the Configuration Bus (10), except the interpreted request message protocols described earlier would follow a series of additional identifier values that would indicate the specific Control Apparatus for which the Tool Device (4) is requesting a property value. The general purpose computer would contain functions for each object class, similar to those contained within the Tool Device (4) that would access the computer database and retrieve the desired archived property values and return them to the Tool Device over the System Bus (40).

The System Bus (40) is more importantly utilized to emulate the machine or process on which the selected hardware is installed, where the respective execution of the Device Performance Profile information is combined with the selected Application Program (14), and the previously captured machine execution timing information is applied to hardware execution timing to emulate the behavior of the entire system when installed on actual hardware. As discussed previously, a System Simulation does not utilize actual Control Apparatus hardware and a System Emulation executes the Application Programs (14) on actual Control Apparatus hardware often with Equipment Application Programs (14) executing on the Control Apparatus hardware to emulate the actual equipment being controlled.

Public Interface System Rules

As referenced and described, Table 13 demonstrates some of the "system rules" that apply to devices that support this system architecture and therefore are important in providing the "Portable Application Programs", primarily requiring the common Object Function Identifiers.

TABLE 13

| Object Class | Relay Object | Producer Object | Display Object |
|---|---|---|---|
| Object Properties | Tag Name | Tag Name | Tag Name |
|  | State | State | State |
|  | FunctionList | FunctionList | FunctionList |
|  | Subclass | Subclass | Subclass |
|  |  | NetworkIdentifier | Rows |
|  |  | Length | Columns |
|  |  | Data | Data |
| Object Internal Functions | NO_EXECUTE | ENABLE | RESET |
|  | NC_EXECUTE | SEND | EXECUTE |
|  | COIL_SET | RELEASE | STRINGUPDATE |
|  | DATA_NO_EXECUTE | SELECTINSTANCE | DATAUPDATE |
|  | DATA_NC_EXECUTE | SET_IDENTIFIER | SELECT_MESSAGELIST |
|  |  | SET_BIT | MESSAGELIST_TO_BUFFER |
|  |  | SET_BYTE | HEX16_TO_BUFFER |
|  |  | SET_WORD | DECIMAL8_TO_BUFFER |
|  |  | SET_STRING | DECIMAL16_TO_BUFFER |
|  |  |  | DECIMAL32_TO_BUFFER |
|  |  |  | CLEAR |
|  |  |  | HORIZONTALBAR |
| Object Network Services | GET_PROPERTY | GET_PROPERTY | GET_PROPERTY |
|  | GET_RESP | GET_RESP | GET_RESP |
|  | GET_ELEMENT | GET_ELEMENT | GET_ELEMENT |
|  | GET_ELEMENT_RESP | GET_ELEMENT_RESP | GET_ELEMENT_RESP |
|  | SET_PROPERTY | SET_PROPERTY | SET_PROPERTY |
|  | SET_RESP | SET_RESP | SET_RESP |
| Error Codes | INVALID_SERVICE | INVALID_SERVICE | INVALID_SERVICE |
|  | INVALID_INSTANCE | INVALID_INSTANCE | INVALID_INSTANCE |
|  | INVALID_PROPERTY | INVALID_PROPERTY | INVALID_PROPERTY |
|  | INSUFFICIENT_RESOURCE | INVALID_ELEMENT | INVALID_ELEMENT |
|  | NOT_SETTABLE | INVALID_ELEMENT_COUNT | INVALID_ELEMENT_COUNT |
|  |  | ELEMENT_LIST_TOO_LONG | ELEMENT_LIST_TOO_LONG |
|  |  | INSUFFICIENT_RESOURCE | INSUFFICIENT_RESOURCE |
|  |  | INVALID_STATE_CONFLICT | NOT_SETTABLE |
|  |  | INVALID_MESSAGE_LENGTH |  |
|  |  | E_TIMEOUT |  |
|  |  | NOT_SETTABLE |  |
|  |  | INVALID_REQUEST_MSG_SIZE |  |

Although the present invention has been described with reference to the specific embodiments described above, it should be recognized that changes may be made in the form and details of the invention as described without departing from spirit of the invention or the scope of the claims.

The invention claimed is:

1. A control system for a controlled process, the control system comprising:
   a plurality of control devices reading electrical signals from sensors attached to elements of the controlled process or providing electrical signals from the control devices to actuators for actuating elements of the controlled process, where different types of control devices contain different electronic hardware where software drivers are written to control the different electronic hardware within the different types of control devices, the control devices further including control software held in computer readable memory and executable by the control devices which includes:
   (a) a set of software objects that implement functions using a common software function call interface common to all the software objects where the common software function call interface defines two interface variables where no more than these two variables are used to pass data between all standardized software functions and having standardized function identifiers that are identical for the same standardized software function for the same software objects of a same object class on the different types of control devices across said control system, the software objects including hardware device driver objects having the common software function call interface in common with all other standardized software functions allowing direct manipulation of the electrical signals of the control devices unique electronic hardware and including other software objects not manipulating the electrical signals of the control devices different electronic hardware;
   (b) a software application program including instructions comprising standardized function calls using identical said standardized function identifiers and said standardized common software function call interface to invoke standardized driver software functions of hardware device drivers objects and used to invoke software objects not manipulating the control devices electronic hardware, and
   (c) an execution engine for running said software application program; whereby a common interface is provided to all standardized software functions including the standardized driver software functions within the different types of control devices containing different electronic hardware and where said software application programs are thus portable across said different types of control devices in said control system.

2. The control system of claim 1, in which: said software objects also have standardized property and class identifiers.

3. The control system of claim 1, in which: each of said control devices further includes a virtual control bus including shared memory for passing values between said software objects where said virtual control bus provides a common internal software function call interface composed of no more than one thirty two bit or less variable and one eight bit or less variable that is in common with all standardized functions calls of all the standardized software object classes contained within the software application program where any standardized software function of any object class return values using the same two interface variables that are then used as input variables to any standardized software function of any other object class within portable application programs within said control device.

4. The control system of claim 3, wherein: the software objects within the control devices having standardized network service identifiers to implement shared interpreted messaging services that have standard interface protocols in common with network service identifiers supported by the same object class within the different types of control devices across said control system, and in which said control devices further include:
   (a) producer and consumer software communications objects that include standardized internal communications related software functions that utilize the common software function call interface as all other standardized function calls within the control device for implementing network communications within software application programs within the control devices that contain different electronic communications hardware where the software application programs are thus portable across different networks utilizing different network protocols, and
   (b) a virtual configuration bus including shared memory on said control device for passing interpreted messages between the control devices used to directly interact with object classes via a network interface.

5. The control system of claim 1, in which: said software objects include: a branch software object and a relay software object.

6. The control system of claim 1, further including: a tool device for monitoring, maintaining, and developing said software application programs for the control devices including the software objects that have standard identifiers in common with the software objects of the same object class within the different types of control devices across said control system.

7. The control system of claim 6, in which said tool device includes: a display engine for interacting with said control devices for diagrammatically displaying hardware features, the software application program features, and networking features of the control devices.

8. The control system of claim 1 in which the hardware device driver objects include an input driver object reading a single electrical signal from the control devices electronic hardware or an output driver object outputting a single electrical signal to the control devices electronic hardware and anywhere in non-hardware device driver objects include a relay object providing logical functions of a virtual relay to monitor status of the single electrical signal or to set status of the single electrical signal from within an application program.

9. A process for operating a control system comprised of a plurality of control devices reading electrical signals of a control devices electronic hardware from sensors attached to elements of a controlled process or providing electrical signals to actuators for actuating elements of the controlled process, where different types of control devices contain different electronic hardware where software drivers are written to control unique electronic hardware within the different types of control devices, the control devices operating under control of different application programs, said process including steps of:
   (a) provisioning said control devices with sets of standardized software objects that implement a standardized function call interface to all standardized software functions for the control device that can be combined in the different application programs to implement internal functionality of the control device and that have a standardized function call interface for all the standardized software objects where the standardized function call interface requires no more than two variables that are shared in common with all standardized software functions and identical function identifiers for the standardized software objects of a same object class contained within the different types of control devices across said control system the standardized software objects including hardware device driver objects having standardized software functions that utilize the standardized function call interface as all other standardized software functions allowing direct manipulation of the electrical signals of the control devices electronic hardware and including other software objects not manipulating the electrical signals of the control devices electronic hardware;

(b) defining application programs in terms of the standardized function call interface for engaging the standardized software functions of said standardized software objects that are based on said standardized function call interface and are compatible with the software objects of the same object class across different control devices containing different electronic hardware across said control system optionally including if and when the control device electronic hardware is updated; and (c) configuring and monitoring said control devices using a tool device composed of a superset of said standardized software objects where the superset of standardized software objects contained within the tool device contain the standardized software functions of the control devices and additional software functions for the object classes utilized within the tool device to configure and monitor interconnection and execution of the standardized software functions within application programs within the control devices independent of the different electronic hardware within the different types of control devices that have standard interfaces in common with the standardized software objects on the different types of control devices across said control system and thus enable a single tool device to be utilized to configure and monitor the different types of control devices optionally sharing some of the application programs across the different types of control devices.

10. The process of claim 9, further including the step of: simulating operation of one or more functional features of the control device using said tool device as an operating environment.

11. A control system for a controlled process, the control system comprising:

a) a plurality of control devices reading a control devices electronic hardware via electrical signals from sensors attached to elements of the controlled process or providing electrical signals from the control devices electronic hardware to actuators for actuating elements of the controlled process, where different types of control devices contain different electronic hardware where software drivers are written to control unique electronic hardware within the different types of control devices, the control devices further including control software held in computer readable memory and executable by the control devices which includes:

(i) a set of standardized software objects that implement different types of internal functions for the control device and that have a software function call interface common to all the standardized software objects where the software function call interface requires no more than two variables that are shared in common with all standardized software functions and standardized reference numbering in common with the standardized software objects of a same object class on the different types of control devices containing different electronic hardware across said control system including shared function call references, software objects including hardware device driver objects having the software function call interface in common with all standardized software functions allowing direct manipulation of the electrical signals of the control devices electronic hardware and including other software objects not manipulating the electrical signals of the control devices electronic hardware (ii) a portable software application program including instructions implemented using standardized software functions based on said standardized reference numbering to the standardized software functions within said standardized software objects for engaging said internal functions optionally including if and when the control device electronic hardware is updated and thereby defining internal operation of the control device, where a control device may allow an end user to invoke the standardized software functions to add software application programs unique to process being controlled or where the end user may optionally change the software application programs that determine internal operational functionality of the control device containing unique electronic hardware when the internal operational functionality is inconsistent with needs of the controlled process, (iii) an execution engine for running said software application program to read and provide electrical signals of the control devices electronic hardware from sensors and to actuators of the controlled process, and b) a tool device for monitoring, maintaining, and developing said software application programs for the control devices including the standardized software objects that comprise a superset of said standardized software objects within one or more of the control devices and that have standardized reference numbering in common with the standardized software objects of the same object class within the different types of control devices across said control system.

12. The control system of claim 11, in which: said standardized software objects also include standardized reference numbering for their shared classes and properties.

13. The control system of claim 11, in which: said standardized software objects include: a branch software object, a timer software object and a relay software object.

14. A control system, comprising:

a plurality of control devices having circuitry reading electrical signals of a control devices electronic hardware from sensors attached to elements of a controlled process or providing electrical signals from the control devices electronic hardware to actuators for actuating elements of a controlled process, where different types of control devices contain different electronic hardware where software drivers are written to control unique electronic hardware within the different types of control devices, the control devices further including control software held in computer readable memory and executable by the control devices which includes:

(a) a set of software functions for the control device including one or more standardized software functions having generic functionality useful in a variety of different control applications, the standardized software functions having a software function call interface in common with all standardized software objects where the software function call interface requires no more than two variables that are shared in common with all standardized software functions and having standardized function identifiers that are shared in common with other software functions of a same object class within the different types of control devices containing different types of electronic hardware across said control system, the software functions including hardware driver functions having the software function call interface in common with all the standardized software functions allowing direct manipulation of electrical signals of the control devices electronic hardware and including other software functions not manipulating electrical signals of the control devices electronic hardware;

(b) a software application program including instructions implemented using a standardized function call interface based on said standardized function identifiers to said standardized software functions for engaging said standardized software functions and thereby the software application programs define specific internal operational functionality of the control device optionally including if and when the control device electronic hardware is updated, where a control device may optionally allow an end user may use the standardized software functions to create software application programs for a controlled process or where the end user may change the specific internal operational functionality of a control device when it conflicts with needs of a controlled process, and (c) an execution engine for running said software application program to read and provide electrical signals of the control devices electronic hardware from and to the controlled process; whereby a common interface is provided to the standardized software functions within the control devices across said control devices containing different electronic hardware in said control system.

15. The control system of claim 14, in which: said standardized software functions are included in the standardized software objects that also have standardized property and class identifiers.

16. The control system of claim 14, in which: each of said control devices further includes a virtual control bus including shared memory for passing values between said standardized software objects.

17. The control system of claim 15, in which: said standardized software objects include a branch software object and a relay software object.

18. The control system of claim 14, in which: said software application program includes one or more of the hardware driver functions for controlling interactions with the control devices electronic hardware from within the software application program.

19. A control system, comprising:

a plurality of control devices having circuitry to collect data from sensors attached to elements of a controlled process or providing data to actuators for actuating elements of a controlled process, the control devices further including control software held in computer readable memory and executable by the control devices which includes:

(a) a set of software functions for the control device including one or more standardized software functions having generic functionality useful in a variety of different control applications the standardized software functions having a standardized software function call interface common to all standardized software objects and having standardized function identifiers that are identical among standardized software functions of a same object class contained within different types of control devices containing different electronic hardware across said control system, the standardized software functions including internal software functions allowing direct manipulation of electrical signals from sensor interface hardware or to actuator interface hardware via hardware device driver objects (b) a software application program including instructions comprising standardized function calls based on said standardized function identifiers to said standardized software functions for engaging said standardized software functions and thereby defining a specific internal operational functionality of the control device optionally including if and when the control device electronic hardware is updated, where a control device may optionally allow an end user to use the standardized software functions to create software application programs for the controlled process or where the end user may change the specific internal operational functionality of a control device when it conflicts with needs of the controlled process, and (c) an execution engine for running internal application programs to read from and write to electronic hardware components utilizing the standardized software functions of the hardware device driver objects to provide electrical signals of the control devices electronic hardware from sensors and to actuators of the controlled process; whereby a common interface is provided to internal functions within the control devices across said control devices in said control system.

20. The control system of claim 19, in which: said standardized software functions are included in the standardized software objects that also have standardized property and class identifiers, and said standardized software objects include a branch software object and a relay software object.

* * * * *

UNITED STATES PATENT AND TRADEMARK OFFICE
CERTIFICATE OF CORRECTION

| | |
|---|---|
| PATENT NO. | : 7,908,020 B2 |
| APPLICATION NO. | : 11/317318 |
| DATED | : March 15, 2011 |
| INVENTOR(S) | : Donald Pieronek |

It is certified that error appears in the above-identified patent and that said Letters Patent is hereby corrected as shown below:

IN THE SPECIFICATION:

Column 43, line 3, delete "sand" and substitute therefore -- thousand --;

IN THE CLAIMS:

Claim 6, column 52, line 34, delete "objects" and substitute therefore -- object --.

Signed and Sealed this
Twenty-ninth Day of May, 2012

David J. Kappos
*Director of the United States Patent and Trademark Office*